US011755729B2

(12) United States Patent
Straw et al.

(10) Patent No.: US 11,755,729 B2
(45) Date of Patent: Sep. 12, 2023

(54) CENTRALIZED SERVER MANAGEMENT FOR CURRENT MONITORING FOR SECURITY

(71) Applicant: SOFTIRON LIMITED, Chilworth (GB)

(72) Inventors: Phillip Edward Straw, Newark, CA (US); Bryan Keith Larmore, Astatula, FL (US); David Patrick Anders, Hurst, TX (US); Stephen Hardwick, Austin, TX (US); Robert Drury, Fotherby (GB); Andrew McNeil, Semer (GB); Harry Richardson, Lamarsh (GB)

(73) Assignee: SOFTIRON LIMITED, London (GB)

( * ) Notice: Subject to any disclaimer, the term of this patent is extended or adjusted under 35 U.S.C. 154(b) by 0 days.

(21) Appl. No.: 17/751,074

(22) Filed: May 23, 2022

(65) Prior Publication Data

US 2022/0284091 A1    Sep. 8, 2022

Related U.S. Application Data

(63) Continuation of application No. 17/396,927, filed on Aug. 9, 2021.
(Continued)

(51) Int. Cl.
*G06F 21/55* (2013.01)
*G06F 21/56* (2013.01)
(Continued)

(52) U.S. Cl.
CPC .......... *G06F 21/554* (2013.01); *G06F 21/556* (2013.01); *G06F 21/566* (2013.01); *G06F 21/572* (2013.01); *G06F 21/87* (2013.01)

(58) Field of Classification Search
None
See application file for complete search history.

(56) References Cited

U.S. PATENT DOCUMENTS

2007/0180314 A1    8/2007   Kawashima et al. ........... 714/15
2009/0260081 A1    10/2009  Johnson et al. ................. 726/22
(Continued)

FOREIGN PATENT DOCUMENTS

| CN | 105915637 A | 8/2016 | ............. H04L 12/10 |
| EP | 2613262 A2 | 7/2013 | ............... G06F 1/32 |

(Continued)

OTHER PUBLICATIONS

Taylor, Michael A. et al., "Sensor-Based Ransomware Detection," Future Technologies Conference, URL: https://saiconference.com/Downloads/FTC2017/Proceedings/112_Paper_254-Sensor-based_Ransomware_Detection.pdf, pp. 794-801, Nov. 30, 2017.
(Continued)

*Primary Examiner* — Nelson S. Giddins
(74) *Attorney, Agent, or Firm* — Slayden Grubert Beard PLLC

(57) ABSTRACT

A system includes a server interface and a management server. The management server includes instructions for execution by a processor. The instructions, when loaded and executed by the processor, cause the processor to access a server through the remote interface and, through the interface, monitor current usage by an electronic device communicatively coupled to the server. The instructions further cause the processor to determine a security status of the electronic device based upon the current usage, and to take a corrective action based upon the security status.

25 Claims, 16 Drawing Sheets

Related U.S. Application Data

(60) Provisional application No. 63/192,301, filed on May 24, 2021, provisional application No. 63/063,133, filed on Aug. 7, 2020.

(51) Int. Cl.
*G06F 21/57* (2013.01)
*G06F 21/87* (2013.01)

(56) References Cited

U.S. PATENT DOCUMENTS

| | | | |
|---|---|---|---|
| 2013/0212413 A1 | 8/2013 | Berndt et al. | 713/310 |
| 2013/0254588 A1 | 9/2013 | Fujieda | 714/4.11 |
| 2017/0230179 A1 | 8/2017 | Mannan et al. | |
| 2018/0267858 A1 | 9/2018 | Bacha et al. | |
| 2019/0005274 A1 | 1/2019 | Field et al. | |
| 2019/0156039 A1* | 5/2019 | Harsany | G06F 21/568 |
| 2019/0166032 A1 | 5/2019 | Inbaraj et al. | |
| 2020/0097057 A1* | 3/2020 | Tseng | H05K 7/1492 |
| 2020/0143047 A1* | 5/2020 | Shivanna | H04L 9/3247 |
| 2020/0279043 A1 | 9/2020 | Thornton et al. | |
| 2021/0110037 A1* | 4/2021 | Hunt | G06F 21/554 |
| 2021/0111887 A1 | 4/2021 | Higley et al. | |

FOREIGN PATENT DOCUMENTS

| | | | |
|---|---|---|---|
| EP | 2642388 A1 | 9/2013 | G06F 11/20 |
| EP | 2645294 A1 | 10/2013 | G06F 21/57 |
| EP | 3486824 A1 | 5/2019 | G06F 21/56 |

OTHER PUBLICATIONS

Hull, Gavin et al, "Ransomware Deployment Methods and Analysis: Views from a Predictive Model and Human Responses," Crime Science, vol. 8, No. 1, 22 pages, Feb. 12, 2019.

International Search Report and Written Opinion, Application No. PCT/EP2022/064122, 12 pages, dated Aug. 30, 2022.

U.S. Non-Final Office Action, U.S. Appl. No. 17/396,927, 23 pages, dated Sep. 1, 2022.

International Search Report and Written Opinion, Application No. PCT/EP/2021/072206, 12 pages, dated Nov. 10, 2021.

International Search Report and Written Opinion, Application No. PCT/EP2022/064351, 11 pages, dated Sep. 28, 2022.

International Search Report and Written Opinion, Application No. PCT/EP2021/073538, 11 pages, dated Dec. 9, 2021.

U.S. Non-Final Office Action, U.S. Appl. No. 17/410,290, 37 pages, dated Nov. 14, 2022.

\* cited by examiner

| Dual processor motherboard with Hard Drive Caddies |
|---|
| BMC (Board ID = 00110001) |
| ATSAMA5D3XA |
| MT29F2G08ABAEAWP |
| MT29F2G08ABAEAWP |
| MT47H128M16 |
| MT47H128M16 |
| ACT8865 |
| Motherboard (Board ID = 00011101) |
| AMD A1120 1.5Ghz |
| AMD A1120 1.5Ghz |
| TCA6424A |
| ISL69147 |
| ISL68124 |
| TCA9548A |
| AT24C512 |
| EMC2305 |
| LM75B |
| VL53L0X |
| NIC Sub Assembly (Board ID= 01011110) |
| EN63A0QI |
| XXV710-AM1 |
| FSAL200 |
| Front Panel (Board ID = 00000010) |
| TCA6424ARGJR |
| Caddy (1-8) (SATA Caddy - 4 HDD Board ID = 00000001) |
| TCA6424ARGJR |
| TCA6424ARGJR |
| Hard Drive |

Table 1 - Example configuration for a dual processor motherboard with hard drive caddies

FIG. 7

| Single processor motherboard with SSD Caddies |
|---|
| BMC (Board ID = 00110001) |
| ATSAMA5D3XA |
| MT29F2G08ABAEAWP |
| MT29F2G08ABAEAWP |
| MT47H128M16 |
| MT47H128M16 |
| ACT8865 |
| Motherboard (Board ID = 00011101) |
| AMD A1120 1.5Ghz |
| TCA6424A |
| ISL69147 |
| ISL68124 |
| TCA9548A |
| AT24C512 |
| EMC2305 |
| LM75B |
| VL53L0X |
| NIC Sub Assembly (Board ID= 01010010) |
| ZI9024 |
| TCA6424ARGJR |
| LV165A |
| FM10420 |
| Front Panel (Board ID = 00000010) |
| TCA6424ARGJR |
| Caddy (1-8) (SATA Caddy - 4 SSD Board ID = 00000001) |
| TCA6424ARGJR |
| TCA6424ARGJR |
| SSD Drive |

Table 2 - Example configuration for a single processor motherboard with SSD caddies

FIG. 8

| | General Configuration | | | | | | | | | | | | | | | | |
|---|---|---|---|---|---|---|---|---|---|---|---|---|---|---|---|---|---|
| | | Voltage V1 | | | | Voltage V2 | | | | Voltage V3 | | | | Voltage V4 | | | |
| | Temp | t1 | t2 | t3 | t4 | t1 | t2 | t3 | t4 | t1 | t2 | t3 | t4 | t1 | t2 | t3 | t4 |
| BMC (Board ID = XXXXXXXX) | | i1 | i2 | i3 | i4 | i5 | i6 | i7 | i8 | i9 | i10 | i11 | i12 | i13 | i14 | i15 | i16 |
| Motherboard (Board ID = XXXXXXXX) | i17 | i18 | i19 | i20 | i21 | i22 | i23 | i24 | i25 | i26 | i27 | i28 | i29 | i30 | i31 | i32 | |
| Motherboard Subsystem (Board ID = XXXXXXXX) | i33 | i34 | i35 | i36 | i37 | i38 | i39 | i40 | i41 | i42 | i43 | i44 | i45 | i46 | i47 | i48 | |
| Front Panel (Board ID = XXXXXXXX) | i49 | i50 | i51 | i52 | i53 | i54 | i55 | i56 | i57 | i58 | i59 | i60 | i61 | i62 | i63 | i64 | |
| Caddie (Board ID = XXXXXXXX) | i65 | i66 | i67 | i68 | i69 | i70 | i71 | i72 | i73 | i74 | i75 | i76 | i77 | i78 | i79 | i80 | |

Table 3 - Template

FIG. 9

| Dual Processor Motherboard with Hard Drive Caddies | | | | | | | | | | | | | | | | | |
|---|---|---|---|---|---|---|---|---|---|---|---|---|---|---|---|---|---|
| | | Voltage 1.2V | | | | Voltage 1.8V | | | | Voltage 3.3V | | | | Voltage 5V | | | |
| | Temp | 20C | 25C | 30C | 40C | 20C | 25C | 30C | 40C | 20C | 25C | 30C | 40C | 20C | 25C | 30C | 40C |
| BMC (Board ID = 00110001) | | 0.35 | 0.38 | 0.45 | 0.47 | 0.25 | 0.3 | 0.36 | 0.4 | 0.61 | 0.64 | 0.67 | 0.71 | 0 | 0 | 0 | 0 |
| Motherboard (Board ID = 00011101) | | 0 | 0 | 0 | 0 | 0 | 0 | 0 | 0 | 3.15 | 3.18 | 3.24 | 3.3 | 3.81 | 3.84 | 3.88 | 3.98 |
| Motherboard Subsystem (Board ID = 01011110) | | 0 | 0 | 0 | 0 | 0 | 0 | 0 | 0 | 1.8 | 1.83 | 1.92 | 1.96 | 0.85 | 0.89 | 0.95 | 1.03 |
| Front Panel (Board ID = 00000010) | | 0 | 0 | 0 | 0 | 0.44 | 0.45 | 0.49 | 0.57 | 0 | 0 | 0 | 0 | 1.88 | 1.9 | 1.95 | 1.98 |
| Caddie (Board ID = 00000001) | | 0 | 0 | 0 | 0 | 0 | 0 | 0 | 0 | 2.6 | 2.63 | 2.64 | 2.72 | 3.1 | 3.11 | 3.12 | 3.2 |

Table 4 - Dual Processor Motherboard with Hard Drive Caddies Using Baseline Operating Environment

FIG. 10

| Single Processor Motherboard with SSD Caddies | | | | | | | | | | | | | | | | |
|---|---|---|---|---|---|---|---|---|---|---|---|---|---|---|---|---|
| | Voltage 1.2V | | | | Voltage 1.8V | | | | Voltage 3.3V | | | | Voltage 5V | | | |
| Temp | 20C | 25C | 30C | 40C | 20C | 25C | 30C | 40C | 20C | 25C | 30C | 40C | 20C | 25C | 30C | 40C |
| BMC (Board ID = 00110001) | 0.35 | 0.39 | 0.42 | 0.44 | 0.25 | 0.32 | 0.41 | 0.47 | 0.61 | 0.71 | 0.79 | 0.85 | 0 | 0 | 0 | 0 |
| Motherboard (Board ID = 00010101) | 0 | 0 | 0 | 0 | 0 | 0 | 0 | 0 | 1.11 | 1.19 | 1.26 | 1.29 | 3.45 | 3.5 | 3.52 | 3.58 |
| Motherboard Subsystem (Board ID = 01010010) | 0 | 0 | 0 | 0 | 0 | 0 | 0 | 0 | 0.95 | 1.05 | 1.06 | 1.07 | 0.7 | 0.78 | 0.83 | 0.84 |
| Front Panel (Board ID = 00000010) | 0 | 0 | 0 | 0 | 0.44 | 0.46 | 0.52 | 0.56 | 0 | 0 | 0 | 0 | 1.88 | 1.92 | 1.98 | 2.01 |
| Caddie (Board ID = 00011000) | 0 | 0 | 0 | 0 | 0 | 0 | 0 | 0 | 1.87 | 1.97 | 2.03 | 2.07 | 2.31 | 2.4 | 2.41 | 2.48 |

Table 5 - Single Processor Motherboard with SSD Caddies Using Baseline Operating Environment

FIG. 11

| Single Processor Motherboard with SSD Caddies | | | | | | | | | | | | | | | | |
|---|---|---|---|---|---|---|---|---|---|---|---|---|---|---|---|---|
| | Voltage 1.2V | | | | Voltage 1.8V | | | | Voltage 3.3V | | | | Voltage 5V | | | |
| Temp | 20C | 25C | 30C | 40C | 20C | 25C | 30C | 40C | 20C | 25C | 30C | 40C | 20C | 25C | 30C | 40C |
| BMC (Board ID = 00110001) | 0.35 | 0.4 | 0.41 | 0.49 | 0.25 | 0.33 | 0.35 | 0.36 | 0.61 | 0.64 | 0.65 | 0.75 | 0 | 0 | 0 | 0 |
| Motherboard (Board ID = 00010101) | 0 | 0 | 0 | 0 | 0 | 0 | 0 | 0 | 3.46 | 3.49 | 3.59 | 3.64 | 4.75 | 4.76 | 4.82 | 4.91 |
| Motherboard Subsystem (Board ID = 01010010) | 0 | 0 | 0 | 0 | 0 | 0 | 0 | 0 | 1.22 | 1.28 | 1.37 | 1.41 | 0.87 | 0.9 | 0.94 | 0.96 |
| Front Panel (Board ID = 00000010) | 0 | 0 | 0 | 0 | 0.44 | 0.5 | 0.59 | 0.64 | 0 | 0 | 0 | 0 | 1.88 | 1.91 | 1.94 | 1.96 |
| Caddie (Board ID = 00011000) | 0 | 0 | 0 | 0 | 0 | 0 | 0 | 0 | 2.71 | 2.81 | 2.89 | 2.92 | 2.44 | 2.49 | 2.57 | 2.62 |

FIG. 12

Table 6 - Single Processor Motherboard with SSD Caddies Under Excessive Load

| Motherboard Variance (3.3V) | | | | | | | | | | | | | | | | | | | | | |
|---|---|---|---|---|---|---|---|---|---|---|---|---|---|---|---|---|---|---|---|---|---|
| Time (Sec) | 1 | 2 | 3 | 4 | 5 | 6 | 7 | 8 | 9 | 10 | 11 | 12 | 13 | 14 | 15 | 16 | 17 | 18 | 19 | 20 |
| Temp (Centigrade) | 24.24 | 24.80 | 25.26 | 25.45 | 24.47 | 24.04 | 24.86 | 24.64 | 24.35 | 24.42 | 24.22 | 25.88 | 24.19 | 24.26 | 24.34 | 24.19 | 25.63 | 25.81 | 25.34 | 25.90 |
| Expected Current (Amps) | 1.18 | 1.06 | 1.13 | 1.11 | 1.20 | 1.03 | 1.18 | 1.01 | 1.01 | 1.18 | 1.08 | 1.18 | 1.08 | 1.15 | 1.13 | 1.01 | 1.15 | 1.17 | 1.15 | 1.14 |
| Actual Current (Amps) | 1.02 | 1.11 | 1.20 | 1.05 | 1.06 | 1.50 | 1.40 | 1.48 | 1.38 | 1.48 | 1.48 | 1.31 | 1.40 | 1.46 | 1.46 | 1.39 | 1.38 | 1.34 | 1.38 | 1.40 |
| Threshold (10%) | 1.309 | 1.309 | 1.309 | 1.309 | 1.309 | 1.309 | 1.309 | 1.309 | 1.309 | 1.309 | 1.309 | 1.309 | 1.309 | 1.309 | 1.309 | 1.309 | 1.309 | 1.309 | 1.309 | 1.309 |

Table 7

CENTRALIZED SERVER MANAGEMENT FOR CURRENT MONITORING FOR SECURITY

PRIORITY

This application in a Continuation of U.S. patent application Ser. No. 17/396,927 filed on Aug. 9, 2021, which claims priority to U.S. Provisional Patent Application No. 63/192,301 filed May 24, 2021, and to U.S. Provisional Patent Application No. 63/063,133 filed Aug. 7, 2020, the contents of which are hereby incorporated in their entirety.

FIELD OF THE INVENTION

The present disclosure relates to monitoring of operation of electronic devices and, more particularly, to a management server for current monitor for security of electronic devices.

BACKGROUND

Attacks on electronic devices may include installation of malware, unauthorized use, and other sophisticated hacking or malicious efforts. Ransomware may be a kind of malware involving cryptovirology that encrypts or otherwise locks data unless a ransom is paid. Unauthorized use may include many varieties of botnets, wherein unauthorized use of a device is used to perform some unauthorized task. Such tasks may include conducting distributed denial of service (DDOS) attacks on yet other devices or performing computations or other unauthorized activities as part of cryptocurrency mining.

Inventors of embodiments of the present disclosure have discovered relationships between current usage of electronic devices and attacks on electronic devices. Accordingly, embodiments of the present disclosure may provide techniques for detecting or preventing attacks on electronic devices.

SUMMARY

Embodiments of the present disclosure may include a system. The system may include a server interface and a management server. The management server may include instructions for execution by a processor. The instructions, when loaded and executed by the processor, may cause the processor to access a server through the remote interface and, through the interface, monitor current usage by an electronic device communicatively coupled to the server. The instructions may further cause the processor to determine a security status of the electronic device based upon the current usage, and to take a corrective action based upon the security status.

Embodiments of the present disclosure may include an article of manufacture. The article may include a non-transitory machine-readable medium. The medium may include instructions. The instructions, when loaded and executed by a processor may cause the processor to access a server through a remote interface and, through the interface, monitor current usage by an electronic device communicatively coupled to the server. The instructions may further cause the processor to determine a security status of the electronic device based upon the current usage, and taking a corrective action based upon the security status.

Embodiments of the present disclosure may include a method performed at a management server. The method may include accessing a server through a remote interface and, through the interface, monitoring current usage by an electronic device communicatively coupled to the server, determining a security status of the electronic device based upon the current usage, and taking a corrective action based upon the security status.

BRIEF DESCRIPTION OF THE DRAWINGS

FIGS. 7-13 illustrate tables showing example configurations of an instance of a server, according to embodiments of the present disclosure.

FIG. 14 is an illustration of a graph of temperature increase as a system load increases, according to embodiments of the present disclosure.

DETAILED DESCRIPTION

Figure 1:
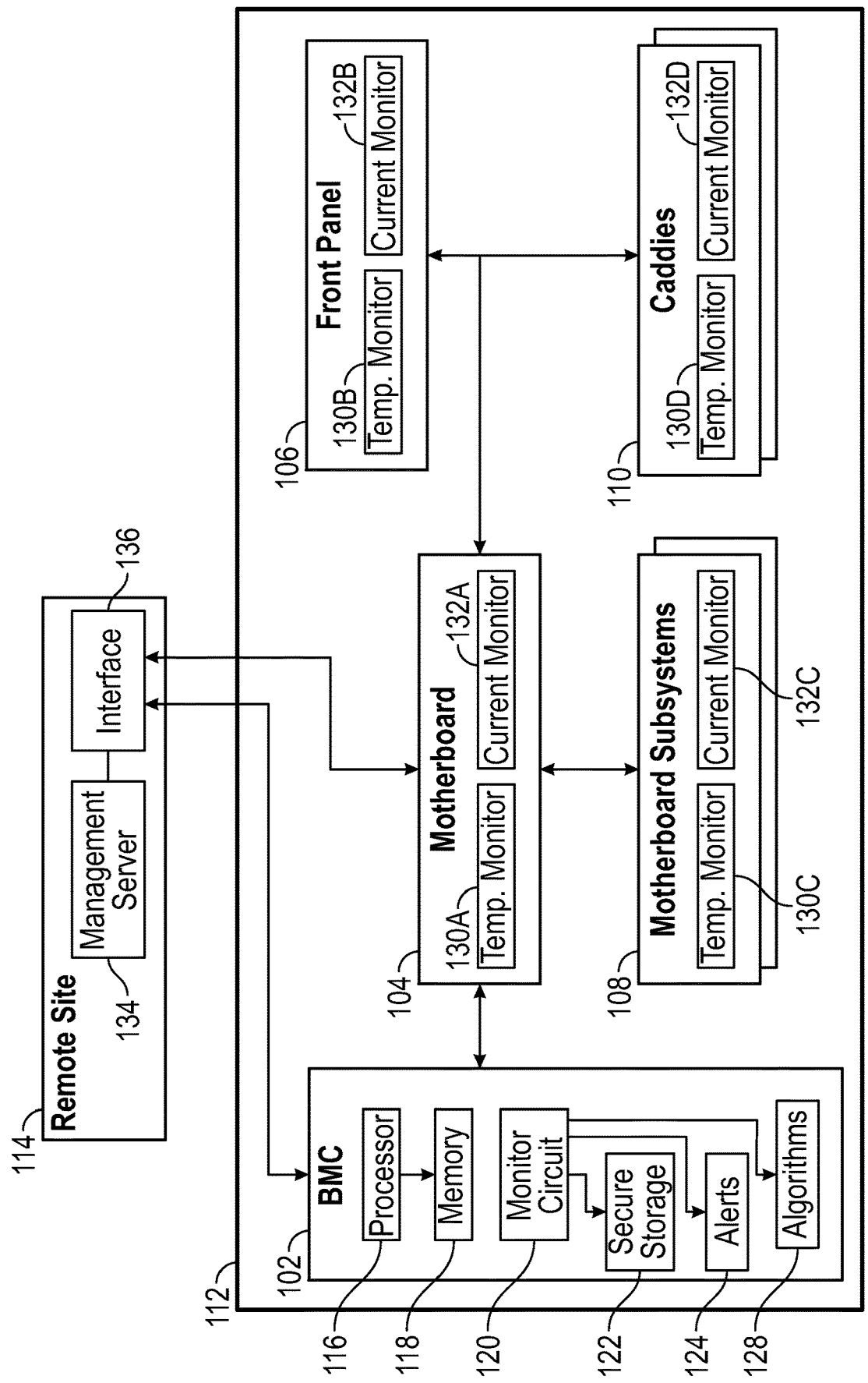
FIG. 1 is an illustration of an example system for monitoring current usage of electronic devices for security, according to embodiments of the present disclosure.

Embodiments of the present disclosure may include a system. The system may be a management system configured to administer multiple other servers, such as client servers. The system may include a server interface to one or more such servers. The server interface may be implemented in any suitable manner to communicate between the system and a server. The server interface may be implemented in any suitable manner or protocol, such as by universal serial bus or Ethernet. The server may be implemented in any suitable manner, such as by a blade server, computer, or other suitable electronic device server. The server may include any suitable components or electronic devices, such as baseboard management controllers, caddies, network cards, processors, front panels, or other subsystems. The system may include a management server. The management server may be implemented by analog circuitry, digital circuitry, instructions for execution by a processor, or any suitable combination thereof. For example, the management server may include instructions for execution by a processor. The instructions, when loaded and executed by the processor, cause the processor to access one of the servers through the remote interface to monitor and configure the server. The instructions may further configure the processor to monitor current usage by an electronic device communicatively coupled to the server. The current usage may be monitored in any suitable manner, such as locally to the electronic device by any suitable current sensor. The instructions may further configure the processor to determine a security status of the electronic device based upon the current usage. The security status may be, for example, whether the electronic device has been attacked or compromised by a malware attack. The instructions may further configure the processor to take a corrective action based upon the security status. Any suitable corrective action may be taken.

In combination with any of the above embodiments, the corrective actions may include, for example, causing generation of any suitable mechanisms, routines, communication interfaces, or other elements for generating alerts and receiving responses to such alerts based upon determinations of whether security has been breached for a given electronic device. The corrective actions may include any of the example operations of the embodiments below.

In combination with any of the above embodiments, the malware attack may be upon any portion of the server, such as a processor, motherboard, caddy, storage device, network card, memory, or other server resources or components.

In combination with any of the above embodiments, the current usage may be evaluated according to any portion of the server, such as a processor, motherboard caddy, storage device, network card, memory, or other server resources or components.

In combination with any of the above embodiments, the current usage may be evaluated in view of the temperature of the server or of the given portion of the server.

In combination with any of the above embodiments, the management server may further include instructions to cause the processor to take the corrective action through out-of-band (OOB) communication with a baseboard management controller (BMC) of the server. The corrective action may be performed directly by the BMC of the server. The OOB communication may be performed through any suitable communication interface or protocol.

In combination with any of the above embodiments, the management server may further include instructions to cause the processor to determine an indication of malware or a security breach on the electronic device. The management server may further include instructions to selectively power down or reconfigure one or more components of the electronic device based on the determination of malware or the security breach. The management server may further include instructions to isolate firmware or Unified Extensible Firmware Interface (UEFI) from a system processor of the electronic device based on the determination of malware or the security breach. The management server may further include instructions to prevent system reboot of the electronic device after a non-operational state detection based on the determination of malware or the security breach.

In combination with any of the above embodiments, the management server may further include instructions to cause the processor to determine a security attack on the electronic device, and to reboot the electronic device and perform a corrective action upon the reboot of the electronic device in response to the security attack. The determination of the security attack may be based upon any suitable analysis of the current usage.

In combination with any of the above embodiments, the management server may further include instructions to cause the processor to determine that the current usage is above an expected value and, based on the determination that the current usage is above the expected value, determine that the security status of the electronic device is compromised. The current usage may be evaluated considering the temperature of the server.

In combination with any of the above embodiments, the management server may further include instructions to cause the processor to determine the security status of the electronic device based upon the current usage by evaluation of the current usage and a temperature of the electronic device. In addition, the current usage may be evaluated considering a position of the electronic device within the server In combination with any of the above embodiments the management server may further include instructions to cause the processor to determine the security status of the electronic device based upon the current usage by evaluation of the current usage and usage load of a resource of the electronic device. The resource may or may not be In combination with any of the above embodiments, the management server may further include instructions to cause the processor to determine that the current usage is above an expected value, and, based on the determination that the current usage is above the expected value, determine that the security status of the electronic device is compromised.

In combination with any of the above embodiments, the management server may further include instructions to cause the processor to evaluate current usage of a specific subcomponent of the electronic device, and determine the security status of the electronic device based upon the current usage of the specific subcomponent of the electronic device.

In combination with any of the above embodiments, the specific subcomponent of the electronic device may be a drive caddy. The management server may further include instructions to cause the processor to determine that the current usage is above an expected value for the drive caddy and, as a result, determine that the security status of the electronic device is compromised.

In combination with any of the above embodiments, the specific subcomponent of the electronic device may be a drive caddy. The management server may further include instructions to cause the processor to determine that the current usage is above an expected value for the drive caddy and, as a result, determine that the security status of the electronic device is compromised by unauthorized data encryption.

In combination with any of the above embodiments, the specific subcomponent of the electronic device may be a processor. The management server may further include instructions to cause the processor to determine that the current usage is above an expected value for the processor and, as a result, determine that the security status of the electronic device is compromised by unauthorized computer-intensive server operations.

In combination with any of the above embodiments, the specific subcomponent of the electronic device may be a processor. The management server may further include instructions to cause the processor to determine that the current usage is above an expected value for the processor and, as a result, determine that the security status of the electronic device is compromised by unauthorized server resource exhaustion.

In combination with any of the above embodiments, the specific subcomponent of the electronic device may be a processor. The management server may further include instructions to cause the processor to determine that the current usage is above an expected value for the processor and, as a result, determine that the security status of the electronic device is compromised by unauthorized server resource usage.

In combination with any of the above embodiments, the specific subcomponent of the electronic device may be a processor. The management server may further include instructions to cause the processor to determine that the current usage is below an expected value for the processor and, as a result, determine that the security status of the electronic device is compromised by a denial-of-service attack.

Embodiments of the present disclosure may include an article of manufacture. The article may include a non-transitory machine-readable medium. The medium may include instructions. The instructions, when loaded and executed by a processor, may configure the processor to perform the operations of any of the above embodiments.

Embodiments of the present disclosure may include methods. The methods may include the operations performed by any of the above embodiments.

FIG. 1 is an illustration of an example system 100 for monitoring current usage of electronic devices for security, according to embodiments of the present disclosure. FIGS. 2-6 illustrate further details of system 100, discussed further below.

System 100 may include one or more servers 112. Servers 112 may be configured to be monitored independently, within a given server 112, or remotely. For example, system 100 may include a remote site 114. Although referred to as remote, remote site 114 may be located anywhere separate from servers 112. In one embodiment, remote site 114 may itself be an instance of a server 112. Servers 112 and remote site 114 may be implemented in any suitable manner, such as by a server, blade server, system on a chip, rack server, computer, or any other suitable electronic device. Servers 112 and remote site 114 may be communicatively coupled to each other, and servers 112 may be communicatively coupled to each other, in any suitable manner.

Each server 112 may include a baseboard management controller (BMC) 102. BMC 102 may be implemented in any suitable manner. For example, BMC 102 may be implemented by analog circuitry, digital circuitry, instructions for execution by a processor, or any suitable combination thereof. BMC 102 may be configured to perform monitoring of temperature or current on various portions of server 112.

BMC 102 may be a self-contained microcontroller system. BMC 102 may be configured to provide a variety of services for the baseboard (also known as a motherboard) or larger system or server where it is installed, such as server 112. As shown in FIG. 1, server 112 may include BMC 102. Moreover, server 112 may include its own operating environment including a processor and memory in a motherboard 104, caddies 110, front panel 106, subsystems 108, external connections, and other suitable components. Motherboard subsystems 108 may be configured to provide localized functions such as external high-speed communications interfaces for server 112. Front panel 106 may be configured to provide interfaces with motherboard 104 such as external displays, and collect external inputs, including manual entry. Caddies 110 may be configured to house various elements, such as hard drives, video processors or network interfaces, or other suitable electronic devices, for server 112.

In one embodiment, BMC 102 may be independent of the rest of server 112. Typically, BMC 102 is designed to work with a specific implementation of a baseboard. This may be realized by a customized design, or a specifically designed software implementation. For example, BMC 102 may include a predefined inventory of contents of server 112. One challenge for BMC 102 is the component makeup of the operating environment of servers 112. In addition to the main processing core of server 112, additional hardware modules can be added to system server 112. BMC 102 may be configured to identify these subsystems and adapt its function to manage these subsystems. These subsystems need not be explicitly defined at the creation of BMC 102, as new ones can be added to server 112 as they are developed and added at a later time.

Server 112 may include any suitable components that are to be monitored by BMC 102. For example, server 112 may include a motherboard 104, a front panel 106, one or more motherboard subsystems 108, and one or more caddies 110. Each of these components may include a temperature monitor 130. Moreover, each of these components may include a current monitor 132. Temperature monitors 130 and current monitors 132 may be implemented in any suitable manner. Each instance of temperature monitors 130 may be implemented in a same or different manner. For example, temperature monitors 130 may be implemented by a thermometer, thermistor, thermocouple, temperature integrated circuit, or any other suitable sensor. Each instance of current monitors 132 may be implemented in a same or different manner. The particular manner of implementation of current monitors 132 may depend upon the particular circuitry that is to be monitored. For example, current monitors 132 may be implemented by a shunt resistor with isolation amplifier, an isolation analog to digital converter, a cored current sensor, a coreless current sensor, a current sensor integrated circuit, or any other suitable sensor.

BMC 102 may include a processor 116. Processor 116 may be implemented in any suitable manner, such as by a microcontroller, microprocessor, application-specific integrated circuit, field-programmable gate array, or other suitable circuitry. Processor 116 may include or may be communicatively coupled to any suitable memory 118. Memory 118 may include instructions that, when loaded and executed by processor 116, cause BMC 102 to perform various operations as described in the present disclosure.

BMC 102 may include a monitor circuit 120. Monitor circuit 120 may be configured to measure the performance of various components of server 112 and take suitable action therefrom. Monitor circuit 120 may be implemented by, for example, analog circuitry, digital circuitry, instructions for execution by a processor (such as processor 116), or any suitable combination thereof. For example, monitor circuit 120 may include circuitry separate from processor 116, circuitry within processor 116, software or firmware including execution of instructions by processor 116, or any suitable combination thereof.

Monitor circuit 120 may include or be communicatively coupled to various resources for monitoring the performance of elements of server 112. Monitor circuit 120 may include or be communicatively coupled to secure storage 122 for storing results of the performance of elements of server 112. Secure storage 122 may be a part of or separate from memory 118. Such storage may be implemented in any suitable manner, such as in persistent memory.

Monitor circuit 120 may be configured to generate alerts 124 based upon the performance of elements of server 112. For example, monitor circuit 120 may be configured to generate interrupts, send messages, notify users or software of system 100, or take any other suitable corrective action. BMC 102 may be configured to generate any suitable mechanisms, routines, communication interfaces, or other elements for generating alerts and receiving responses to such alerts based upon determinations of whether security has been breached for a given electronic device. BMC 102 may be configured to take corrective action based upon such determinations.

Monitor circuit 120 may be configured to perform various algorithms 128. These may be defined by other portions of system 100 or may be included within monitor circuit 120 for execution. Algorithms 128 may include a shared library, functions, firmware, software, or other suitable mechanisms for evaluating temperature and current of electronic devices communicatively coupled to BMC 102. Algorithms 128 may be configured to evaluate whether security has been breached for a given electronic device based upon temperature or current data.

As discussed above, server 112 may include one or more electronic devices, subsystems, or other elements that are communicatively coupled to BMC 102 and are to be monitored by BMC 102. In one embodiment, BMC 102 may be communicatively coupled to these electronic devices only at monitors 130, 132. Each of the components of server 112 may be implemented in any suitable manner and may include any suitable additional electronic device. For example, each component may be a component of a larger electronic device, a blade server, motherboard, storage, communications device, or other suitable mechanisms. In each component, an instance of temperature monitor 130 may be included. Furthermore, in each component, an instance of current monitor 132 may be included. Monitors 130, 132 may be configured to provide information to BMC 102 upon any suitable criteria, such as periodically, on-demand by request from BMC 102, or upon certain events such as temperature or current reaching a threshold level.

BMC 102 may include any suitable communication interfaces. The communication interfaces may be implemented in any suitable manner and may be configured to communicate in any suitable format, protocol, or communication method. The communication interface may include in-band or out-of-band communication with other portions of server 112 such as motherboard 104, other instances of BMC 102, other servers 112, or remote site 114. For example, BMC 102 may utilize an I2C, SPI, or UART connection to motherboard 104, and Ethernet or USB to connect to other BMCs 102 or remote site 114.

Remote site 114 may be configured to communicate with BMC 102 via a secure out-of-band (OOB) channel, such as a wireless network, non-production local area network, etc. BMC 102 may connect to secure OOB channel via, for example, Ethernet or USB. BMC 102 can be powered locally, or externally through the OOB channel, such as with power over Ethernet (POE), or USB Power Delivery (USB PD).

Figure 2:
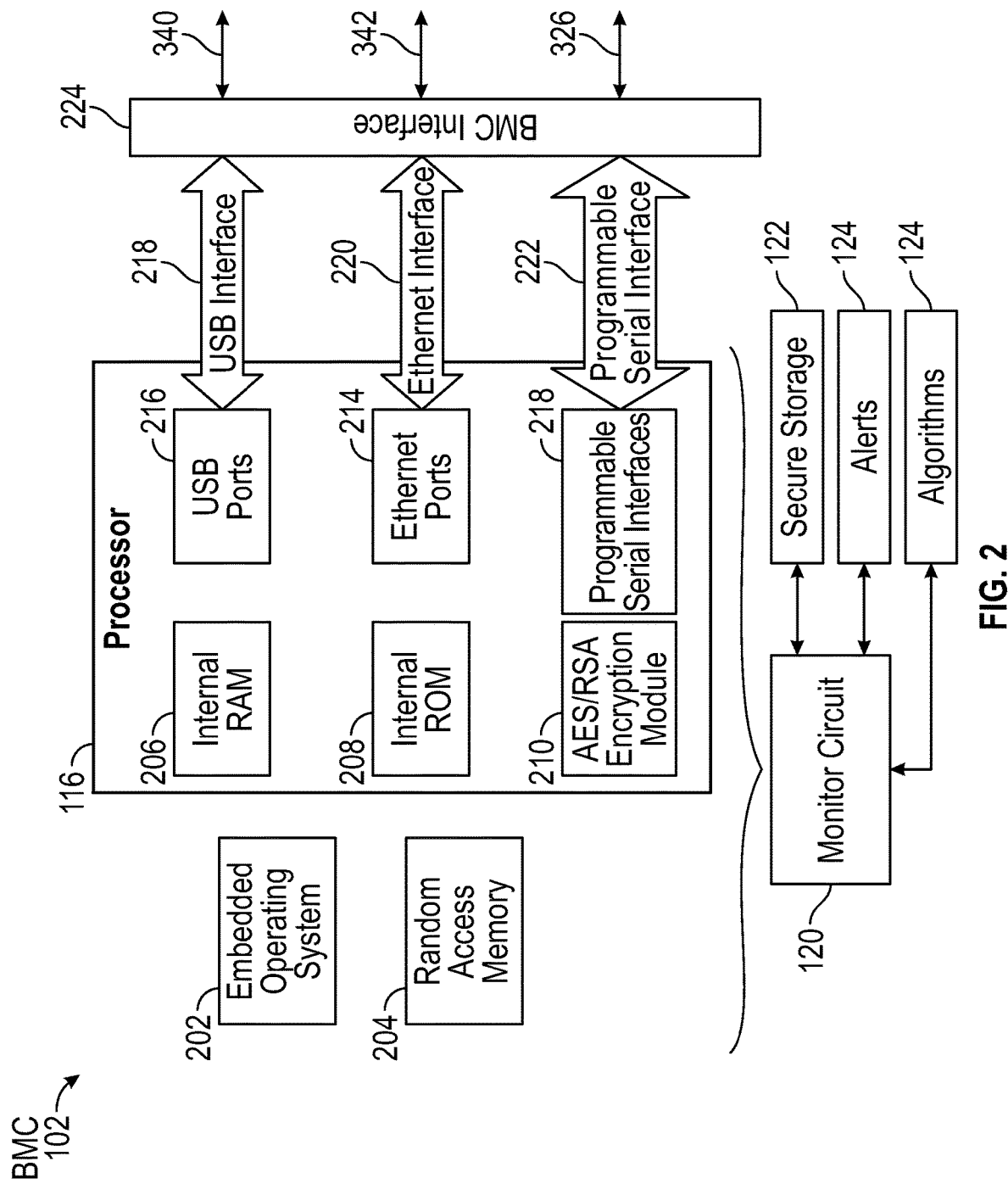
FIG. 2 is a more detailed illustration of a baseboard management controller, according to embodiments of the present disclosure.
Figure 3:
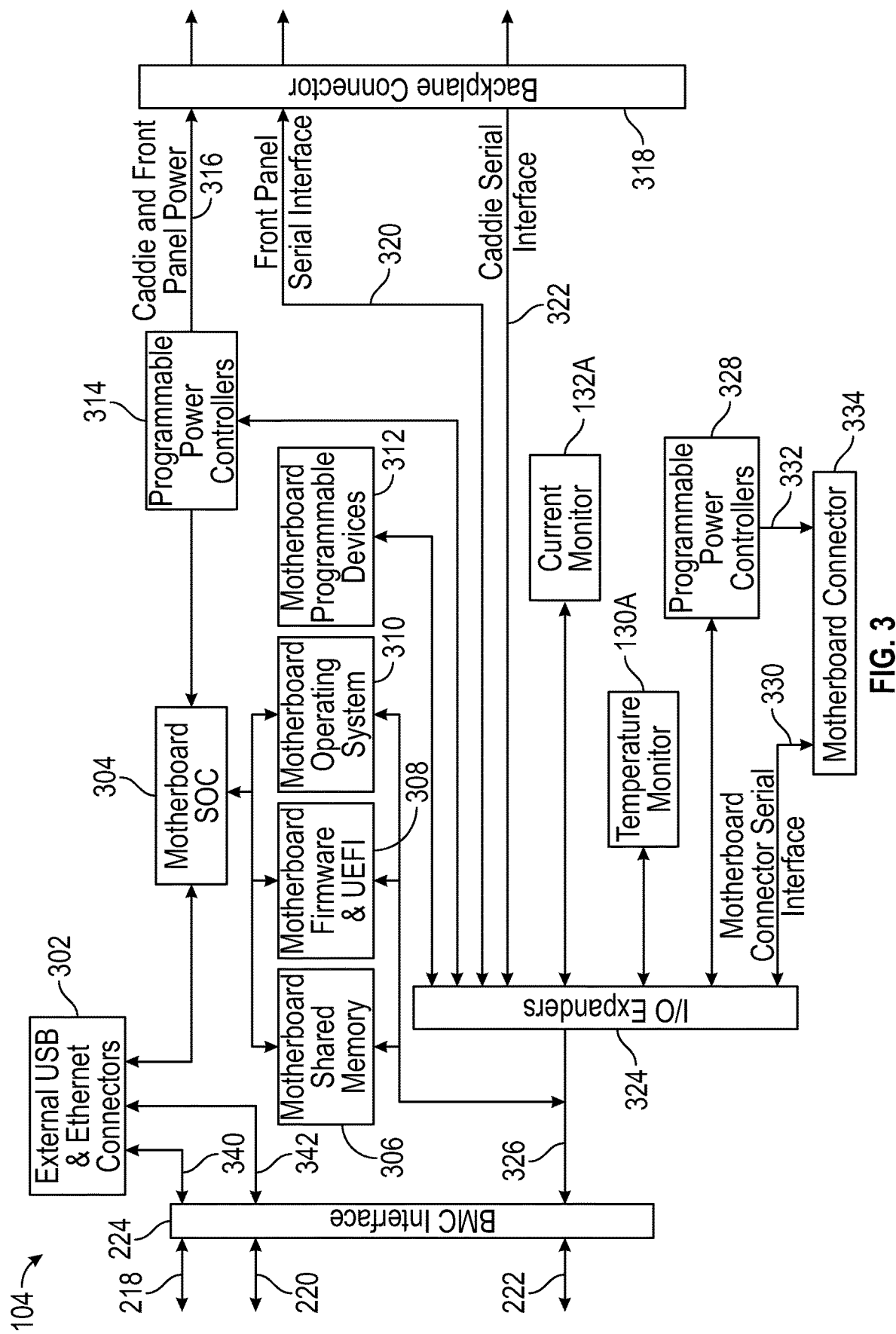
FIG. 3 is a more detailed illustration of a motherboard, according to embodiments of the present disclosure.

FIG. 2 is a more detailed illustration of BMC 102, according to embodiments of the present disclosure. Moreover, FIG. 3 is a more detailed illustration of motherboard 104, according to embodiments of the present disclosure.

BMC 102 has a processor 116, embedded operating system 202, and random-access memory 128. Processor 116 contains internal RAM 206, internal ROM 208, encryption module 210, USB ports 216, Ethernet ports 214, and programmable serial interfaces (PSI) 212. To secure an OOB channel, encryption module 210 may be configured to implement cryptographic algorithms such as Advanced Standard Encryption (AES), Rivest-Shamir-Adleman (RSA), or other suitable cryptographic algorithms. The processor is realized as an SoC. BMC 102 includes connections to motherboard 104 including a USB interface 218, Ethernet interface 220, and programmable serial interface 222.

Motherboard 104 may contain the core functions required for server 112 to operate. A system on a chip (SoC) 304 may control the normal operations of server 112. SoC 304 may be connected to internal memory resources for firmware & UEFI 308 and a motherboard operating system 310. External communications may be provided by external USB and Ethernet connectors 302. Additional functions may be provided by SoC 304, but are not shown.

Ethernet interface 220 and USB interface 218 from BMC 102 connect to separate external USB and Ethernet motherboard connectors 302. In addition to providing external communications capabilities to BMC 102, these interfaces can also be used to provide operating power when the local power is not available—such as in Advanced Configuration and Power Interface (ACPI) sleep state G3.

BMC 102, by virtue of processor 116, has its own operating system. This is contained partially in Internal ROM 208 and also in embedded operating system 202. This allows BMC 102 to operate independently from motherboard 104. Encryption module 210 provides local cryptographic functions to BMC 102. These functions can be used to create secure communications protocols with remote site 114.

PSI 222 from BMC 102 is used to control many devices in the server architecture. On motherboard 104, PSI 222 from BMC 102 to PSI 326 can directly control motherboard shared memory 306, motherboard firmware & UEFI 308, and motherboard OS 310. Motherboard SoC 304 can be physically disconnected from motherboard shared memory 306 and motherboard firmware & UEFI 308 using one of motherboard programmable devices 312. When disconnected, this gives BMC 102 sole access control over those memory components.

I/O expanders 324 allow a PSI 326 to be routed throughout server 112 as follows. Motherboard connector serial interface 330 extends the PSI to motherboard subsystems 108. Motherboard connector serial interface 320 extends the PSI to front panel 106. caddie serial interface 322 extends the PSI to caddie 110. Programmable power controllers 328 provide power to motherboard SoC 304, front panel 106, and caddie 110. Programmable power controllers 314 provide power to motherboard subsystems 108. Motherboard programmable devices 312 can include SoC memory isolation and determination of versions of server components.

Figure 4:
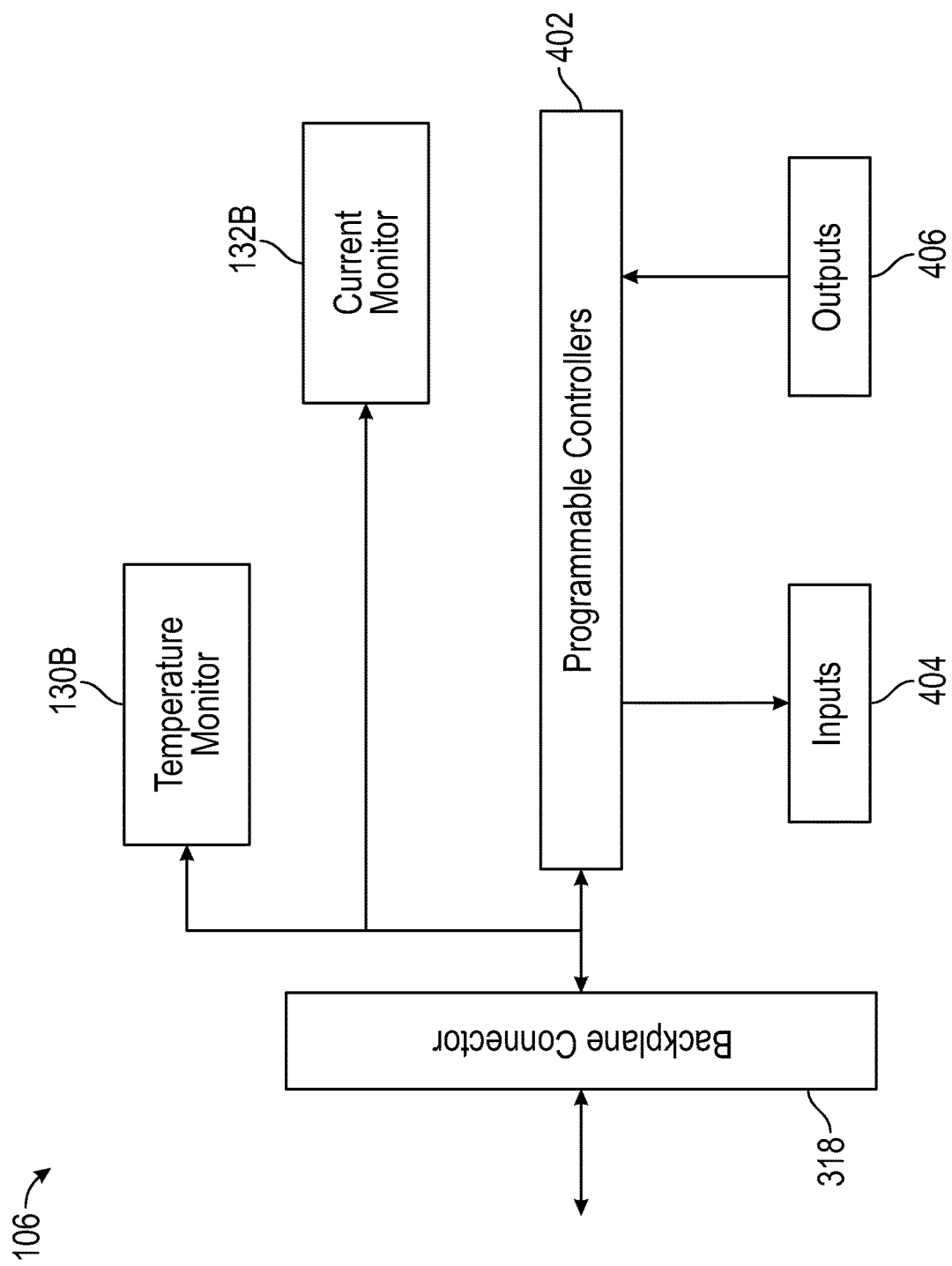
FIG. 4 is a more detailed illustration of a front panel, according to embodiments of the present disclosure

FIG. 4 is a more detailed illustration of front panel 106, according to embodiments of the present disclosure.

Using programmable power controllers 328 and 314, BMC 102 can selectively control the power of various elements of server 112. This can include removal of power from motherboard SoC 304, but leaving power to motherboard shared memory 306 and motherboard firmware and UEFI 308. BMC 102 can remove power from front panel 106 to prevent any external inputs 404 or outputs 406. These outputs may include visual or auditory alerting features. BMC 102 can remove power to caddie 110 to disable various hardware components 604, such as powering down hard drives. BMC 102 can remove power to motherboard subsystems 108 to power down communications interface 504.

Figure 5:
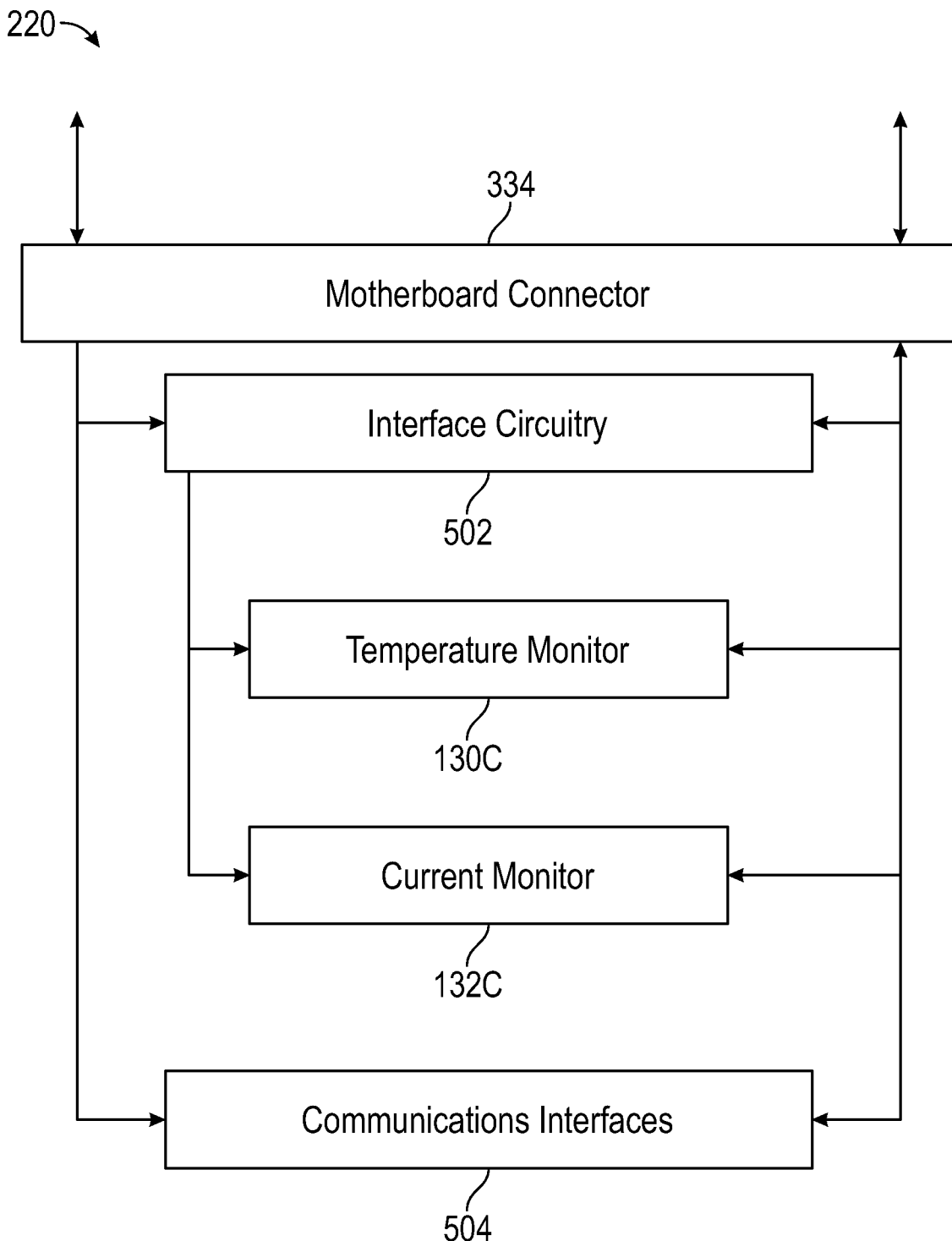
FIG. 5 is a more detailed illustration of motherboard subsystems, according to embodiments of the present disclosure.
Figure 6:
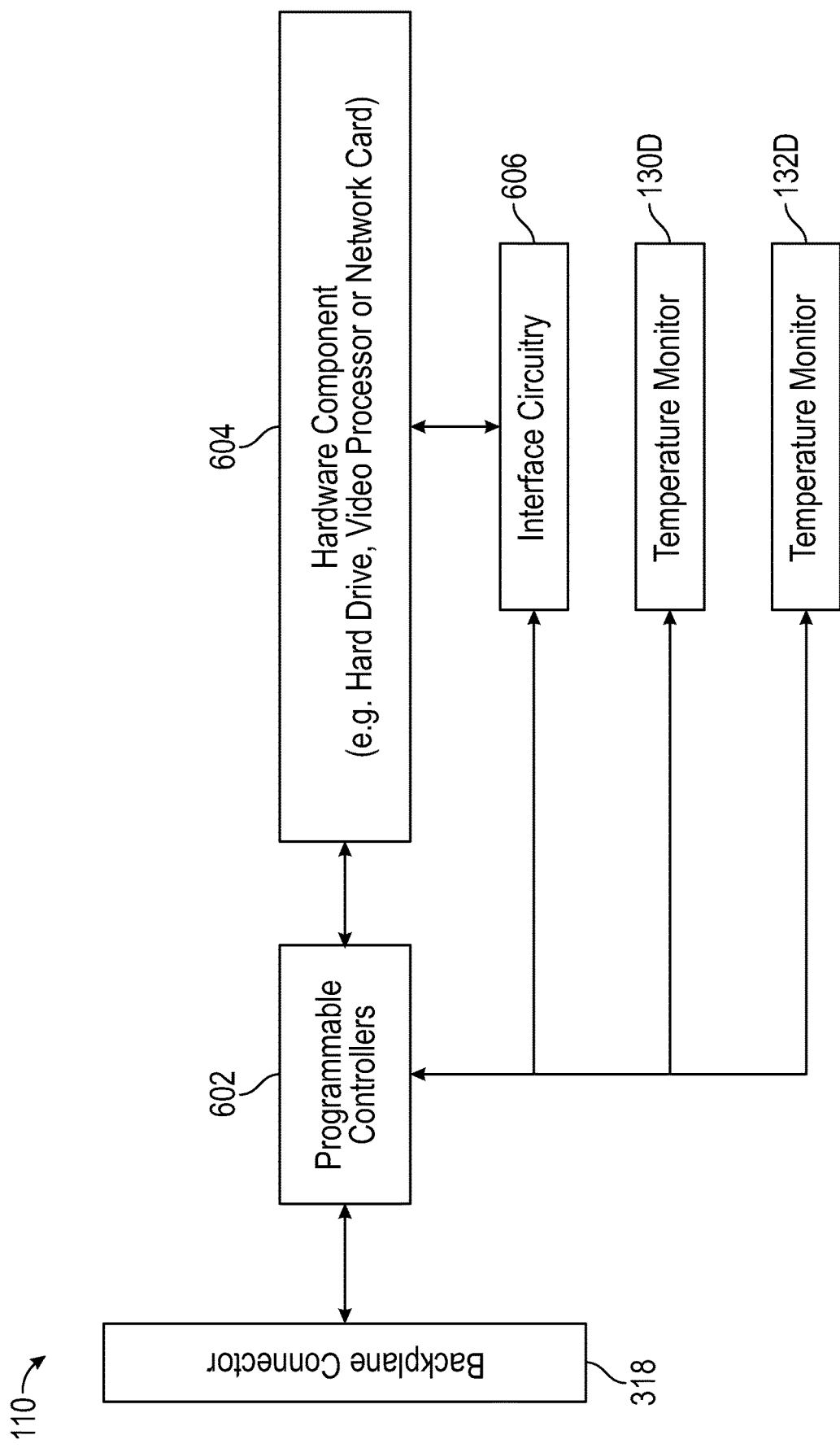
FIG. 6 is a more detailed illustration of caddies, according to embodiments of the present disclosure.

FIG. 5 is a more detailed illustration of motherboard subsystems 108, according to embodiments of the present disclosure. FIG. 6 is a more detailed illustration of caddies 110, according to embodiments of the present disclosure. In addition to removing power to disable server functions, BMC 102 can also put individual components in standby modes when they are not needed.

As well as controlling power in server 112, the PSI can be used to retrieve temperature and current information for motherboard 104, motherboard subsystems 108, front panel 106, and caddie 110. The information on the motherboard is collected by temperature monitor 130a and current monitor 132a. The information on motherboard subsystems 108 is collected by temperature monitor 130c and current monitor 132c and delivered to BMC 102. The information for front panel 106 is collected by temperature monitor 130b and current monitor 132b and delivered to BMC 102. The information on caddie 110 is collected by temperature monitor 130d and current monitor 132d and delivered to BMC 102. This data, as will be shown later, can be used to indicate a security breach within any of these components.

The operation of BMC 102 to ensure integrity of system 100 against unauthorized access may be difficult, given attempts on hardware of system 100. This can be further complicated by the inclusion of multiple subsystems in system 100 from a variety of manufacturers. Further the actor conducting the malicious attack may try to remove any detection elements in place on server 100. Embodiments of the present disclosure may address these challenges by measuring the current consumed by various hierarchical portions of the hardware of system 100 and the thermal output that results. BMC 102 may be separate from the hardware portions of system 100 that are monitored, but may still be used in conjunction with motherboard 104 and associated sub-systems thereof, such as front panel 106, caddies 110, and motherboard subsystems 108. This independence may allow BMC 102 to perform measurements and corrective actions that directly affect the electronic devices of system 100. Such corrective actions may include, for example, shutting down electronic devices or portions thereof. BMC 102 may also contain cryptographic services that can secure any current or temperature data for storage. BMC 102 may also establish secure communications between other instances of BMC 102.

Moreover, one of the challenges with server architectures is making remote access when server 112 operational environment is functioning incorrectly. This may happen, for example, during a security breach. In a standard configuration or in other implementations, the network connectivity may not be available, or may be compromised, in this eventuality. Further, the ability to query server telemetry may also be restricted due to the behavior of the security breach due to the malicious control of server 112 processor, e.g., motherboard SoC 304. The independent capability of BMC 102 will still allow network connections by using Ethernet ports 214 or USB ports 216 with external USB and Ethernet connectors 302. BMC 102 can independently collect telemetry information even when motherboard SOC 304 has been compromised. This data can then be securely transmitted to remote site 114 using an 00B connection.

A given server 112 may have a myriad of multiple possible configurations. The specific configuration of electronic components therein may affect the current that is to be used by server 112, or a sub-system thereof. Accordingly, to account for this variation, the list of hardware components in a given server 112 or sub-system thereof may be dynamically generated. This may be performed by, for example, monitor circuit 120 or any other suitable part of system 100. A dynamic hardware tree for the specific configuration of the electronic devices communicatively coupled to BMC 102 may be generated. The tree may be an ordered or hierarchical list of assemblies, sub-assemblies, modules, and components for all modules in system 100, such as "assemblies>>sub-assemblies>>modules>>components" for all modules in the system. The tree may include a board type, revision, or another version identifier for each element. Sample trees are provided below. BMC 102 may load a tree of devices as appropriate. In the advent of any changes in hardware in server 112, this tree can be rebuilt autonomously. BMC 102 may detect when new devices are added or when devices are removed, or when new drivers are added or updated. This may trigger the compilation of a new device tree. The BMC can use the single software load to align the driver set to match the current device tree.

A set of "known-good" expected results may be determined given a particular tree with a combination of elements from a library of possible components. In one embodiment, the set of "known-good" expected results may not necessarily be a mere linear summation of individual devices, but a profile generated for the specific combination of devices installed. Monitor circuit 120 may be configured to compare a measured amount of current or temperature of server 112 or a subsystem thereof against a corresponding known-good results in the tree. If the actual values measured are greater or lower than the known-good values, monitor circuit 120 may be configured to take any suitable corrective action. Suitable corrective actions may include, for example, a front panel alert on front panel 106, a network management alert, or preventing a portion or all of server 112 from initialization, alerting a user, or taking any other suitable corrective action.

In one embodiment, the known-good results of the tree may take into account the temperatures of the components. The current consumption may be dependent on the component temperature. Examples are provided in the spreadsheets below. The component temperature can be influenced both internally (according to usage of internal circuitry therein) and externally (according to temperatures in the rack or of nearby components). Accordingly, an acceptable variation between the known-good values and the measured values based upon the measured temperature may be computed or applied by algorithms run by monitor circuit 120. The computation may be based on the temperature measured on each module in a particular system or subsystem, plus temperature measurements of other similarly configured systems in the complete implementation. This will allow the computation to take into account temperature changes due to the operating environment.

Figure 15:
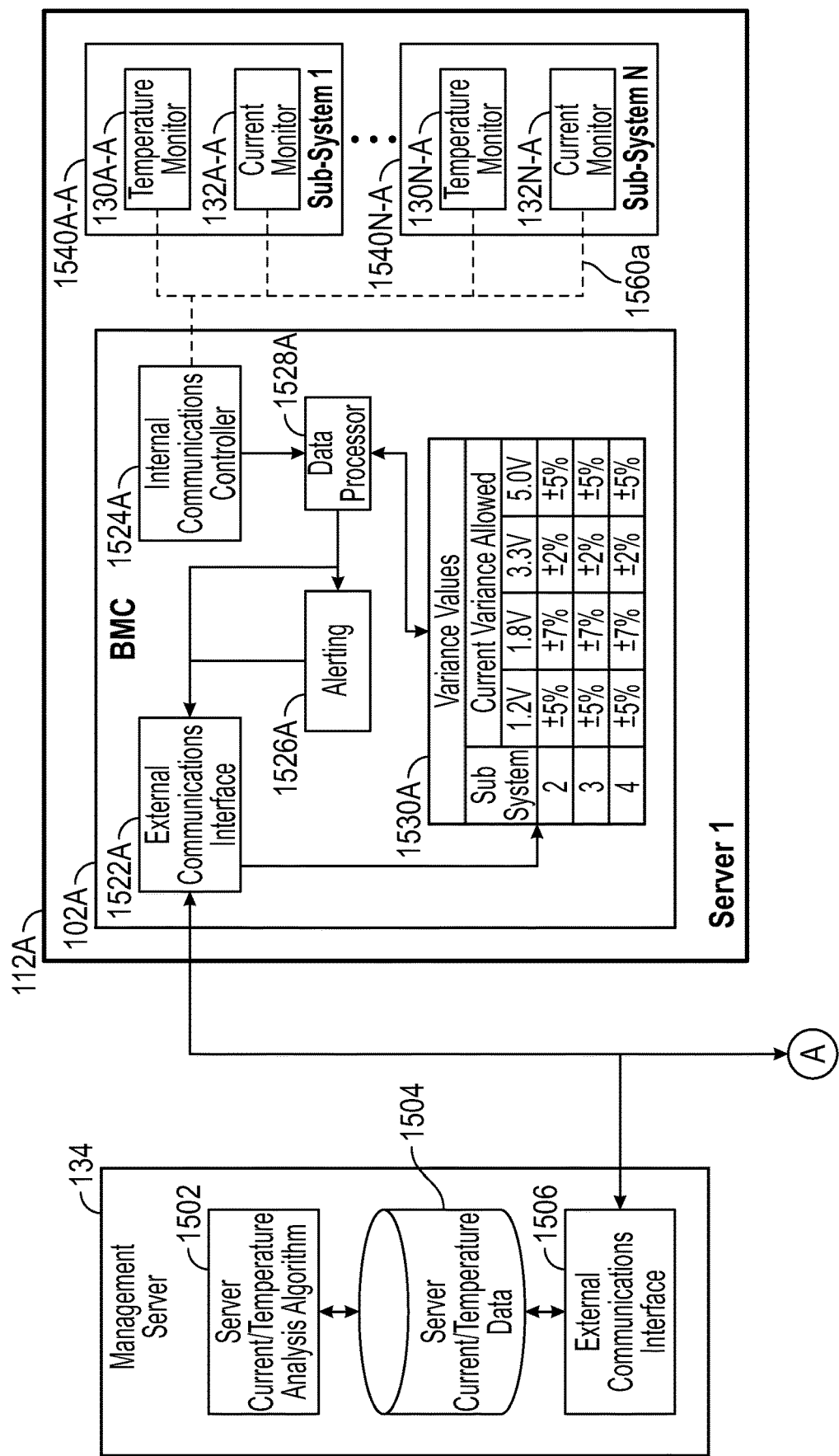
FIG. 15 is an illustration of a trend line of different temperature and current information between different instances of a given server of the same configuration, according to embodiments of the present disclosure.
Figure 15:
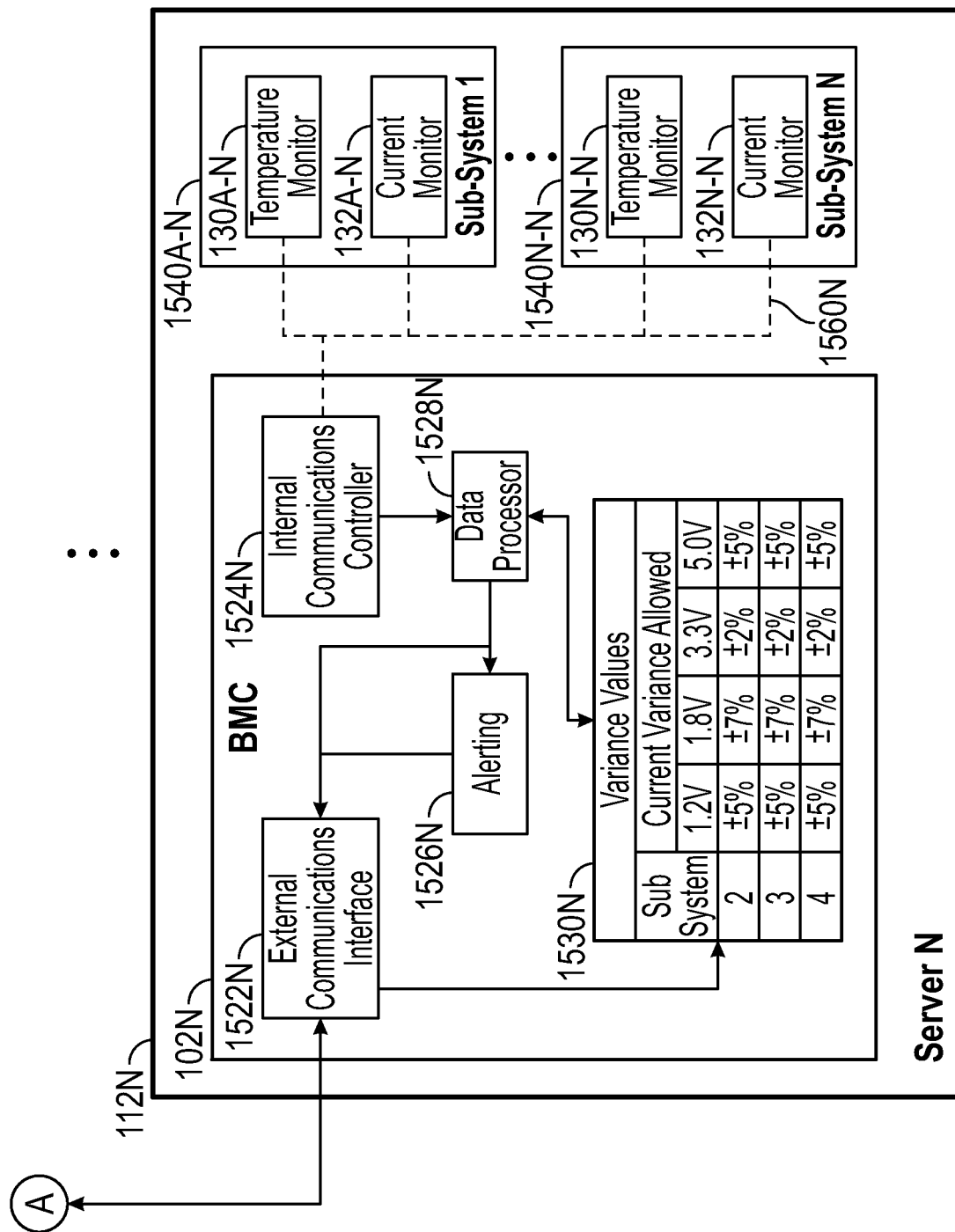
Figure 16:
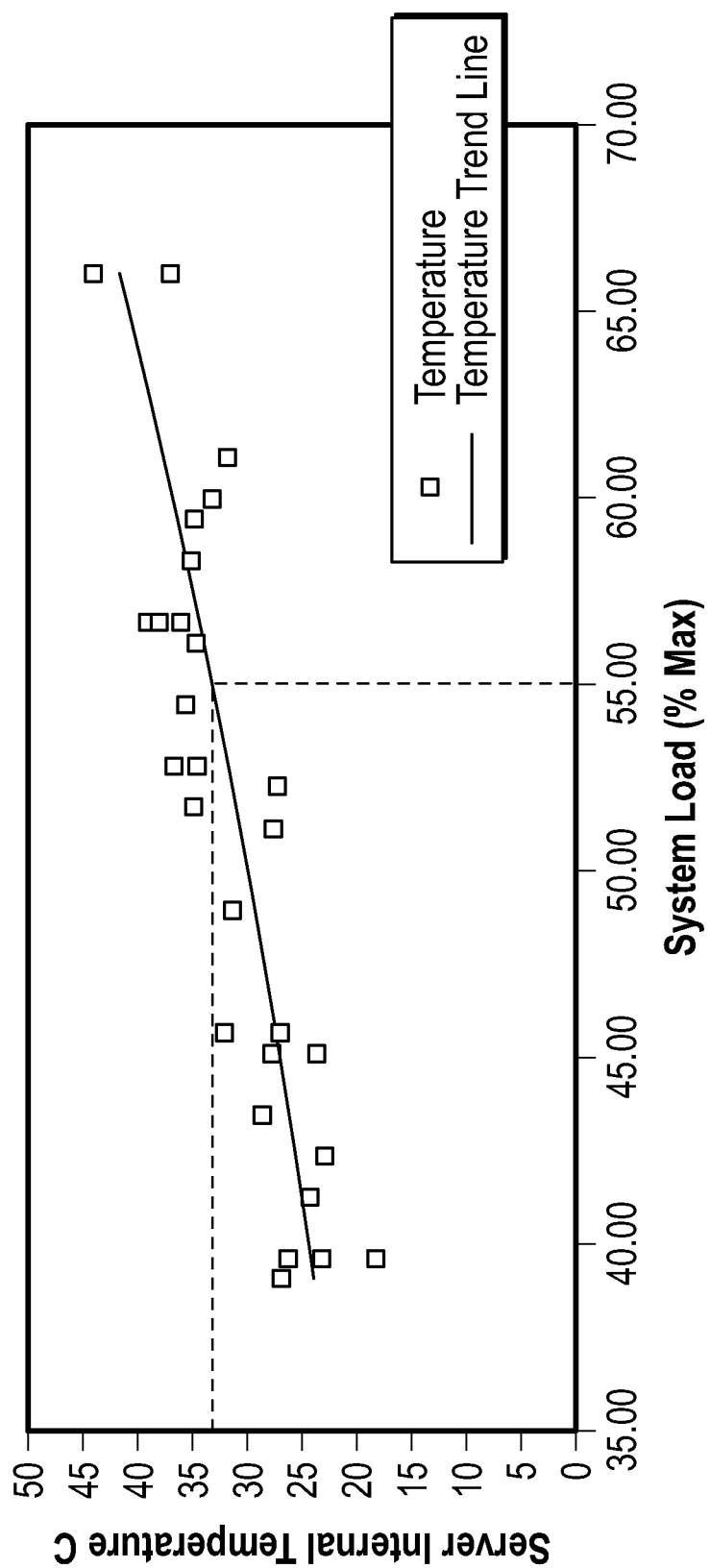
FIG. 16 is an illustration of a set of temperature data for multiple servers with the same configuration, according to embodiments of the present disclosure.

In one embodiment, the known-good values of current may be dependent upon the operating temperature of server 112 or components thereof. The operating temperature of a particular portion of server 112 may depend on the ambient temperature within its specific position within an installation, such as a position within a rack. Server 112 might not necessarily know or store position information as configuration information as server 112 is constructed. BMC 102 may be configured to determine the configuration of server 112 in which it sits. By exchanging temperature and current information between BMCs 102 of different instances of servers 112 of the same configuration, BMCs 102 may use the results of an algorithm, linear, polynomial, exponential, logarithmic, or another suitable method to develop a trend line for the accumulated data. This is shown in, for example, FIG. 15 below. This data can be collected by each BMC 102 by monitor circuit 120. The data may be collected at a given BMC 102 from other BMCs 102 in a distributed fashion, or collected centrally by management server 134 from each BMC 102. The algorithm can then make a determination of the influence of the ambient temperature by virtue of the deviance from the trend line for a given system load. FIG. 16 shows a set of temperature data for multiple servers with the same configuration, or a configuration that provides a current usage that closely matches the target server, together with the computed trend line. If the average load for a specific server is 55%, using the graph, the operating temperature should be 33C, indicated by the dotted lines in FIG.

16. During a calibration period, and when the system is in a known safe condition, it can be assumed that any variance between this derived value and the measured value is due to external ambient temperature. If the server had an average measured temperature of 35° C. at 55% load, then there is a 2° C. contribution from the ambient temperature. Therefore, the measured temperature can be reduced by 2° C. for the purpose of evaluating malicious attacks on the system. As can also be seen from FIG. 14, the temperature increases as the system load increases. The increase in temperature with system load is due to increased current consumption. Consequently, the temperature and current usage are directly proportional to the operating system load. Typically, a light load is defined as a system that is operational but not processing any user data, around 10%-20% maximum load. A reference or baseline load is for a system that is processing data at a predefined level, with a predefined configuration used for baseline testing, typically 20%-30% of maximum load. A representative load is the measured average operating load over a given period of time, such as 60% of maximum load for 5 minutes. An excessive load is when the system is in danger of exhausting all of its resources, such as 90-95% of maximum load. Maximum load is when the system has completely used all of its resources 100% load.

In one embodiment, the current usage of components of server 112 may further depend upon the processing or other activity load that is performed by server 112. The operating temperature of a particular portion of server 112 may depend upon the processing or other activity that that portion, and adjoining portions, of server 112 are performing. The known-good operating parameters may thus express a dependence or relationship to particular operating loads.

BMC 102 may be configured to query the configuration of server 112 as a whole at any suitable time, such as upon boot-up, periodically, upon addition of a new element to server 112, or upon demand by a user or software. Since server 112 may be deliberately designed to allow module substitutions, BMC 102 may be configured to create a new, baseline "known-good" configuration that matches any new configuration. In order to accomplish this, BMC 102 may include libraries or have access to databases of information of different configurations. New module configurations, that were developed after server 112 was initially baselined, may be added. BMC 102 may update its libraries using a secure direct connection from BMC 102 to a specific remote storage location. This may include, for example, remote site 114. BMC 102 may also query other servers 112 to which it is connected to get updated configuration data. For example, a hard drive caddy instance of caddy 110 may fail and be replaced with a newer version that has an equivalent function, but different components that may have different current usage profiles.

Although server 112 has been designed to allow module substitutions, unauthorized changes could be made at the component level. This may be performed as part of a malicious attack or as part of an inadvertent mistake. Moreover, this could be accomplished in a fashion where it may not be discovered by a BMC 102 component scan. For example, a module may be substituted for another, but the new module may spoof the identity of the previous module to BMC 102. The new module may respond to identity queries with the identity of the previous module.

The known-good values may be expressed by, include, or be compared using a tolerance level. For example, given a known-good value, a tolerance level may be applied, beyond which a measured current value may be determined to be unacceptable. Typically, an unauthorized activity will have a consistent load value, such as 10%-20% of the maximum load. This may lead to consistent additional current drain. For example, an additional current usage of 0.75 A-1.2 A at 5V may be observed. For a single processor motherboard with SSD caddies, the 5V baseline load in Table 5 at 25° C. shows a total current usage of 8.6 A. The additional unauthorized load for this configuration may be calculated as 8.66%-13.86%. Using the 5V excessive load in Table 6 at 25° C. shows a total current usage of 10.0 A. The amount increase for the additional unauthorized load for this configuration is 7.5%-12.0%. Therefore, the tolerances that are used to detect unauthorized current usage may be adjusted for system load to accommodate for the current usage variance. The same is also true for temperature. Using these tolerances, for example, if the measured current values are too low, then BMC 102 may be configured to determine that something has been removed from server 112 or from the subsystem thereof. If the measured current values are too high, then BMC 102 may be configured to determine that something has been added to server 112 or to the subsystem thereof. In one embodiment, based upon an initial determination that server 112 has had an element added or removed, BMC 102 may be configured to determine which subsystem has had an element added or removed. This may be performed by subsequently evaluating the current usage of each of the subsystems, such as motherboard 104, a front panel 106, one or more motherboard subsystems 108, and one or more caddies 110. Once one or more of these subsystems are identified as causing the current usage anomaly of server 112, the identified subsystems may in turn be evaluated to determine if subsystems therein have caused the current overage or underage. This process may be repeated until the specific subsystem that has had an element added or removed has been identified. Based on the measured variation, BMC 102 may be configured to determine the most likely component that has been removed or added.

BMC 102 may be configured to communicate with other portions of system 100 in any suitable manner, through any suitable interface, and with any suitable protocol. BMC 102 may be configured to communicate with other instances of BMC 102 or remote site 114. Communication between instances of BMC 102 may be performed using out-of-band communication channels. Remote site 114 may include a management server 134. Management server 134 may be implemented by instructions in a memory for execution by a processor. Management server 134 may be configured to communicate with instances of BMC 102 or motherboard 104. Communication with BMC 102 may be performed with in-band or out-of-band communication channels. BMC 102 may be configured to share corrective actions, alerts, temperature data, or current data with other instances of BMC 102 or with management server 134. Management server 134 may in turn provide such information to other instances of BMC 102.

Embodiments of the present disclosure may include a library in each or accessible to each BMC 102. The library may be included in BMC 102 in memory storage. The library may include specific reference lists of static current consumption for various hardware configurations of server 112 that may be discovered by BMC 102. The tree configurations may be built or derived from this library. The library may be compiled through settings provided by a user, by polling electronic devices or their identity, or through any other suitable manner.

The library may include a specific reference list of dynamic current consumption for various hardware configurations that are discovered by BMC 102. The reference list may include a list of defined operations to be applied to the components, such as load percentage for particular components, from which to measure and record dynamic current consumption. The library may include specific reference lists of static thermal output (wherein no load is present) for various hardware configurations that are discovered by BMC 102. In one embodiment, the library may include definitions of variance from these static thermal output baselines based upon various dynamic loads that are to be applied. In another embodiment, the library may include specific reference lists or definitions of dynamic thermal output for various hardware configurations. BMC 102 may provide an encrypted location for the reference lists in a central location, such as in BMC 102 or in memory. BMC 102 may provide a method to remotely update the library or reference lists, especially when newer versions of modules are added to the overall system configuration. These may come from, for example, management server 134 or other BMCs 102.

In operation, BMC 102 may measure static current consumption from one or more portions of system 112 and compare these against a reference to determine the integrity of hardware of server 112. BMC 102 may measure product dynamic current consumption from one or more portions of system 112 and compare these against a reference to determine integrity of hardware of server 112. BMC 102 may measure static thermal output from one or more portions of system 112 and compare these against a reference to determine integrity of hardware of server 112. BMC 102 may measure dynamic thermal output from one or more portions of system 112 and compare these against a reference to determine integrity of hardware of server 112. BMC 102 may record variance of static current measurements, dynamic current measurements, static thermal output, and dynamic thermal output from reference values. BMC 102 may evaluate these variances against a list of variance limits to determine if additional components have been added or removed. BMC 102 may perform one of a list of passive actions to respond to limits being exceeded (e.g., send alerts), or may perform one of a list of active actions to respond to limits being exceeded (e.g., power down product). Corrective actions may be coordinated between instances of BMC 102, wherein after one server 112 is found suspect, additional measurements may be triggered in the same or other servers 112. For example, the subsystems of the identified server 112 may be further tested. In another example, a particular test that identified a faulty server 112 or portion thereof, such as a dynamic test of a caddie 110, for a given server 112 may be repeated for other instances of server 112. BMC 102 may determine the most likely component module that has been affected based on measured results.

In one embodiment, BMC 102 may be configured to use comparative data to adjust the "known-good" reference to adapt to the local environment. This may be performed after static or dynamic temperature or current measurements have been made for an accepted period of time when the hardware configuration is known to be secured.

Tests may be performed on any suitable basis, such as periodically, on-demand by a user, or upon detection of another event. For example, the tests can be executed based on the detection of the physical removal of product components, such as a product cover within a server 112. Moreover, a given instance of BMC 102 may be configured to remotely gather or initiate the current and temperature tests from other BMCs 102. This may be performed through OOB communication between BMCs 102.

BMC 102 may be configured to provide various functionality or to access server 112 while the main system on a chip (SoC) of server 112 is not otherwise accessible. BMC 102 may provide this functionality for other elements to access server 112. Moreover, because BMC 102 is independent of the other server components, it can perform several functions.

First, BMC 102 may be configured to update the library independent of server 112 components such as the SoC 304 therein. BMC 102 may be configured to use PSI 222 to determine the inventory of hardware components within server 112, bypassing SoC 304. When a server component is changed, BMC 102 may detect the new hardware configuration and install the required hardware driver from the universal library directly into motherboard firmware and UEFI 308. Using OOB channels, management server 134 can communicate with BMC 102 and maintain the universal library through updates. This can be accomplished even if server 112 is powered down in, for example, ACPI sleep state G3. BMC 102 can individually isolate and power system memories such as motherboard shared memory 306 or motherboard firmware & UEFI 308. Drivers can then be loaded without powering any additional server 112 components. The new drivers will be available when server 112 powers up and boots into normal operation.

Second, BMC 102 may be configured to access a non-responsive server 112, thus not relying upon SoC 304 therein. In certain circumstances server 112 can enter a non-responsive state. This is normally due to a malfunction within the hardware or software of server 112. Alternatively, it can be due to the action of malicious software. In this state, server 112 does not perform its normal operations, nor can communications be established to motherboard 104. A typical response to this condition is to reboot server 112. However, valuable information can be lost when employing such a typical response. This is especially true when server 112 has been compromised with malicious code. Using BMC 102, hardware and software in motherboard 104, motherboard subsystems 108, front panel 106, and caddie 110 can be queried using serial interface 222 without the involvement of motherboard SoC 304. This will allow remote management server 134 or BMC 102 to attempt a diagnosis and provide corrective measures. Remote management server 134 can then use BMC 102 to respond. This can include, but is not limited to, the following operations, restoring system software to a known-good state, verifying hardware/firmware/software configurations, or powering down specific server components 130, 108, 106, or 110, including motherboard SoC 304 and associated motherboard OS 310. These components can remain powered down, even after a subsequent reboot, to isolate a faulty component. The corrective measures may also include performing system diagnostics, at a granular level, with or without motherboard SoC 304 being powered on. The corrective measures may also include collecting logging information directly from motherboard shared memory 306. The corrective measures may also include downloading corrective measures and storing them in motherboard shared memory 306 to be used in the next boot cycle.

As discussed above, BMC 102 and motherboard SoC 304 share or can access common memory elements including motherboard shared memory 306 and motherboard firmware & UEFI 308. Server 112 can store logging information in motherboard shared memory 306. Should server 112 become unresponsive, then BMC 102 can power down motherboard SoC 304 via programmable power controller 328. BMC 102 can also use motherboard programmable devices 312 to isolate motherboard shared memory 306. BMC 102 can then query the logging information with motherboard SoC 304, motherboard OS 310, and motherboard firmware and UEFI 308 being completely disabled. The disablement can result from server 112 being powered down (intentionally or unintentionally), or from motherboard SoC 304 failing to correctly execute motherboard operating software 148. In the latter state, it may not respond to any external commands to provide corrective actions, such as reboot commands, and be deemed non-operational. Using BMC 102 to power down motherboard SoC 304 may be advantageous if the non-operational state was a result of malicious software. In many cases, malicious software will perform unwanted actions during power down and reboot that may compromise logging information.

FIGS. 7-13 illustrate tables showing example configurations of an instance of server 112, according to embodiments of the present disclosure. Current values may be given in amps. The values are given for the overall power consumption of the sub-assembly. In some assemblies, there is limited voltage use. In actual practice, the sub-assembly will contain voltage converters as there are several voltage levels that are monitored. Unique, hard-coded identifiers can be used to enumerate the elements in each component, such as BMC 102, motherboard 104, motherboard subsystem 108, front panel 106, and caddies 110. For each of the identified components, there will be an associated inventory of hardware devices. Shown in FIGS. 7-8 are two such example configurations. In FIG. 7, Table 1 is shown with an example configuration for a dual-processor motherboard with hard drive caddies. In FIG. 8, Table 2 is shown with an example configuration for a single processor motherboard with SSD caddies.

Furthermore, in FIGS. 9-14 are tables showing example working values of these two candidate systems. Current values may be given in amps. The values are given for the average overall expected current consumption of a respective BMC, motherboard, sub-assembly, or another device. The values in the tables will be measured using a baseline operating environment that is representative of the normal use of the subassembly. However, the baseline environment will be specifically constructed to minimize any external influences, especially heating and cooling. This will ensure that any temperature increases are solely due to the operation of server 112 itself. To be able to take into consideration likely external operating environments, the ambient server temperature will be artificially increased or decreased. This will give several specifically defined temperature points where the current values in the baseline environment can be measured.

In some assemblies, there is limited voltage use. In actual practice, the sub-assembly will contain voltage converters as there are several voltage levels that are monitored. For example, the voltage can be supplied to sub-assemblies 106, 108, 110 using motherboard 104 and programmable power controllers 314, 328. Since sub-assemblies 106, 108, 110 may convert the voltage from the motherboard to a local voltage, only the current consumed by those derived voltages will be shown. For example, the motherboard supplies 5V to a sub-assembly. However, the sub-assembly may only require 3.3V. The subassembly may contain its own programmable power controller to derive the 3.3V supply from the 5V supply provided by the motherboard. Consequently, only the current for the 3.3V would be measured and not the 5V from which it is derived. In all cases, the programmable power controllers, on any sub-assembly, would be controlled by BMC 102 and the voltages set depending on the component list.

As discussed above, in FIG. 7, Table 1 illustrates configuration of a dual-processor motherboard with hard drive caddies. In FIG. 8, Table 2 illustrates configuration of a single processor motherboard with SSD caddies. FIGS. 9-14 illustrate operational examples of these configurations.

In Table 3 in FIG. 9, the options of a general configuration or a template are shown. Each element of the system is identified on the left. As described earlier in Tables 1-2, each element may have its own components or subassemblies. Each such element or subassembly may have measurements, known-good values, or other data for currents (i1-i80). A current may be identified for different combinations of voltage (V1-V4) and temperatures (t1-t4). The specific voltage and temperature combinations are provided as mere examples. More or fewer combinations may be used to characterize a system. A given subassembly or component may be configured to utilize different voltages at different times or to utilize different voltages for different portions of the subassembly or component therein.

Tables 4 and 5 in FIGS. 10-11 are example configurations of the above systems using the baseline operating environment that is representative of the normal use of the subassembly. Note in areas where a zero current is registered, this denotes that the voltage level is not used on that particular component. This is important if an unauthorized modification is made to a specific component where the voltage has been added by that unauthorized modification to the hardware. Tables 4 and 5 in FIGS. 10-11 are illustrations of an example configuration of a system at rest, with nominal computation or communication activity, and thus no load.

In contrast, Table 6 in FIG. 12 is another example configuration of a system (single processor motherboard with SSD caddies), with an excessive load arising from, for example, performing 1 TB write operations followed by read operations every 20 minutes through a NIC. The excessive load will create a different set of conditions from those used in the baseline operating environment.

By comparing the measured current between Table 5 and the measured current in Table 6, it can be seen that the additional amount of processing that has been added above the baseline environment, e.g., applying an excessive load to the configuration, has resulted in higher current values for the motherboard, motherboard subsystems, and caddies. Therefore, it can be construed that there will be an expected level of variance between the current values defined by the baseline configuration and actual measured values. Further that this variance will change over time as different operating conditions are applied to the configuration.

Table 7 in FIG. 12 is an example profile of a given component, such as the motherboard in a single processor motherboard with SSD caddies, at a particular voltage, such as 3.3V. Although only this specific set of values are shown for simplicity, it can be understood, referencing the instance measurements in Tables 5-6, that several different combinations of component, temperature, and voltage may yield varying current values over time. Examples of the expected and actual current values are provided over such a period of time. Although Table 5 and Table 6 are shown for two different loading conditions (baseline and excessive), other tables may be available that show additional loading conditions. In this manner expected current used can be determined based on both temperature and system loading.

Figures 13, 14:
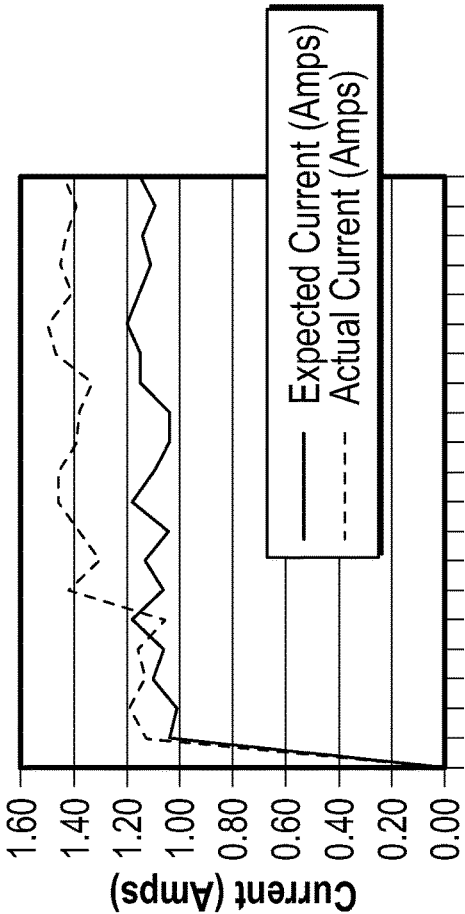

This may result in the performance illustrated in Table 7 of FIG. 13, which may show example variance of a motherboard current in a single processor motherboard with SSD caddies. Only one data set is given for an example variance for a motherboard in a Single processor motherboard with SSD caddies configuration operating at a temperature of 25 C. Others would follow the same pattern. According to Table 5, the baseline value, "known-good", for the motherboard in this configuration is 1.19 amps for 3.3V at 25 C. The threshold is set at 10%. This gives a threshold current of 1.1*1.19 or 1.308 amps.

FIG. 14 is the graphical equivalent of FIG. 13. As shown therein, as time progresses, the actual current used by the motherboard jumps to above 1.308 amps, while the expected current remains below 1.308 amps. A given threshold may be used to compare the actual current and the expected (or "known-good") current. The threshold gives a tolerance range for the expected value to vary from the baseline value. This accommodates for variances in ambient temperature and server loading. If the difference is greater than the threshold, then the variance may trigger an alarm condition that the security of the component has been compromised. The threshold may be defined in any suitable manner, such as an absolute difference or a relative or percentage difference. The threshold may be specific to a given system, component, sub-assembly, or any combination thereof.

In a controlled physical environment, the increase in temperature of a server would be directly dependent upon its utilization. This relies on a defined ambient temperature of the operating environment and a laminar airflow within server 112. When placed in its actual operating environment, e.g., a datacenter rack, the ambient temperature may vary as a whole, or locally due to server position. To be effective, consideration may be made for the impact of temperature variation due to external phenomena. Furthermore, server loading may also vary, for example, a period of high demand. Consideration may be also made for the increased current consumption due to sporadic loading. As explained earlier, this can be accomplished by gathering data from a plurality of servers and applying an algorithm to adjust the variance limits accordingly. FIG. 15 below shows an example of such a system. The values of the tables above may be derived from actual measurements as discussed above.

FIG. 15 is an illustration of system 100 within the context of multiple servers 112 wherein multiple instances of BMC 102 may operate together, according to embodiments of the present disclosure.

As shown in FIG. 15, a given BMC 102A can query temperature monitors 130A-A-130N-A and current monitors 130A-A-130N-A within subsystems 1540A-A-1540N-A of server 112A. As shown in FIG. 1, subsystems 1540 may include instances of motherboard 104, motherboard subsystems 108, front panel 106, caddies 110, or other suitable modular components, along with their respective current and temperature monitors. BMC 102 102A can use its processor 116 together with embedded operating system 102 and RAM 204 to execute software programs that provide data processing and alerting functions. The data from these monitors can be sent to a data processor 1528A via an internal communications controller (ICC) 1524A using an internal interface 1560A. ICC 1524 may be implemented by, for example, any suitable one of USB ports 216, Ethernet ports 214, or PSI 218. Data processor 1528a may compare the current values against a set of known-good values using a set of variance values 1530A. If the current values are outside of the known-good values with the applied variance, then an alerting 1526A element is notified. The measured current and temperature values, plus the alerting state, can be provided to management server 134 via a BMC external communications interface 1522A, an external network, and an external communications interface 1506. The data can then be loaded into a server current/temperature data database 1504 at remote site 114.

External communications interface 1506 of management server 134, using an external network, can connect to multiple servers 112 using each respective external communications interface 1522. The respective data processor 1528 may collect and analyze data from the temperature monitors 130 and current monitors 132 in sub-systems 1540 of each server 112 using the respective internal interface 1560 and internal communications controller 1524 therein. Variance values 1530 are used to generate alerts that are provided to external communications interface 1522 from alerting element 1526. In this manner temperature and current data can be collected from multiple servers at multiple intervals into server current/temperature data database 1504.

Using a server current/temperature analysis algorithm 1502, management server 134 can use comparative analysis to generate the correct variance values 330. For example, the analysis can take into consideration relative operating temperatures for multiple servers to adjust the variance values. This will accommodate any effect due to the external ambient temperature of the datacenter and server location with a specific rack. Management server 134 can also review the latest hardware inventory that has been reported by BMCs 102 for each of servers 112 and use this to update the variance values for any new components that have been added/removed. Management server 134 may evaluate alerting messages that are received. as described earlier, management server 134 may also collect server logging information, even if server 112 is in a non-operational state. With this information, using the server current/temperature analysis algorithm 1502, management server 134 may determine if the alert is a false alarm. Based on logging information and historical data, the algorithm can detect and accommodate sporadic server loading conditions. If it is deemed a false alarm, variance values 330 can be dynamically updated accordingly. If it is not a false alarm, management server 134 can take remedial actions.

Any suitable remedial actions may be taken. These may be performed through an OOB communication with BMC 102 instances if a given server 112 is otherwise inoperable, or may be performed through communication directly with a SoC 304 of a given server 112.

For example, management server 134 may cause, for an identified server 112, restoration of system software to a known-good state. Management server 134 may verify hardware/firmware/software configurations. Management server 134 may power down specific server components, including motherboard SoC 304 and associated motherboard operating system 310. These components can remain powered down, even after a subsequent reboot, to isolate a faulty component. Management server 134 may perform system diagnostics, at a granular level, with or without the motherboard SoC 304 being powered on. Management server 134 may collect logging information directly from motherboard shared memory 306. Management server 134 may download corrective measures and store them in motherboard shared memory 306 to be used in the next boot cycle.

System 100 may be configured to determine any suitable kind of security breach based upon current usage. This may be performed by, for example, BMC 102 or management server 134.

Management server 134 or BMC 102 may be configured to protect system 100 or server 112 from unauthorized data encryption. For example, in a ransomware attack, data of system 100 may be encrypted but the author of the ransomware may withhold the decryption key. The malware, since it is not part of the normal operation of system 100, may add additional load on a given server 112. The data encryption operation may require processor effort to perform the encryption. This may increase the current consumption of the processor elements, such as SoC 304. Furthermore, retrieving the data to be encrypted and then rewriting it may increase the amount of current required by the caddie components, such as a caddie 110 and a hardware component 604 therein, such as a hard drive. Detection of increased current by these components may cause a ransomware attack alert.

Management server 134 or BMC 102 may be configured to protect system 100 or server 112 from unauthorized computer-intensive server operations. For example, in a cryptocurrency mining attack, resources of system 100 may be taken control of by malware in order to attempt to create new cryptocurrency by solving a computational puzzle. The amount of computing power required to do this may be high due to the complexity of the calculations required. Because of the computing cost, attackers may maliciously use the resources of system 100 to do this task. Due to the high amount of processing power used during such an attack, the amount of processor current consumed may be increased, without a commensurate increase in any other component. In some cases, malware will use a distributed approach and employ several different servers to accomplish the task. Having a centralized system, such as management server 134, to observe the rise of current usage in multiple servers 112 may aid in detecting this type of unauthorized activity.

Management server 134 or BMC 102 may be configured to protect system 100 or server 112 against a bricked server or server resource exhaustion. Server resource exhaustion may include that server 112 has run out of resources and can no longer operate. For example, a server may run out of memory. In this case, server 112 will typically operate in a repetitive loop trying to resolve the issue. This may be referred to as a bricked server. Resources for which server 112 may be exhausted may include computer cycles, memory, or network bandwidth.

Management server 134 or BMC 102 may be configured to protect system 100 or server 112 against unauthorized server resource exhaustion. For example, in a denial-of-service attack, an attacker may attempt to overwhelm server 112 by flooding it with large amounts of invalid incoming traffic. The intent is to either prevent access to server 112 by authorized users, or to put server 112 into a recovery mode. As server 112 tries to accommodate the invalid traffic the motherboard and the network interface sub-assemblies will draw more current as the load increases. This may be an example of unauthorized server resource exhaustion. Eventually, server 112 will either degrade to a state where processing and networking resources are exhausted, or reset server 112 into a standby mode. In the latter case, the amount of current consumed by server 112 as a whole may significantly decrease as server 112 may isolate itself from the network and not process valid incoming traffic. It may be possible to develop current usage profiles that match the various cases of DOS attacks and responses thereto.

In one embodiment, a mapping of the source of the current increase experienced by server 112 may be made to types of the attack that is being perpetrated and the subcomponent that is targeted. For example, high current usage of the processor may be a cryptocurrency mining attack, while high current usage of a network card may be a denial-of-service attack.

Management server 134 or BMC 102 may be configured to protect system 100 or server 112 against unauthorized server usage. Unauthorized server usage may include cases wherein server 112 is still functioning, but executing additional, unauthorized code. For example, a virus is unauthorized server usage. With issues such as cryptocurrency mining, the additional load of unauthorized use is very high. A CPU can go from 20% to 90% of projected maximum utilization. The hacker does not want to exhaust the resources else their code will not run. The net result is much higher CPU processing, increasing current consumption, and slower execution of authorized code. Because the authorized code is still running, it is harder to detect. In some cases, an attacker will simply want to exploit server storage and distribution. In this case, server 112 will run normally with the exception that the attacker has created an unauthorized repository in server 112. However, the additional content will be distributed, and this will cause load on the storage and network sub-assemblies. This may be used to, for example, store and distribute streaming video content to multiple endpoints. This may be an example of unauthorized server resources usage. The extra loading will result in increases in current for the storage and network sub-assemblies. Further, the loading may also be present in times when the server is expected to have a low current load, such as outside normal working hours.

In some embodiments, unauthorized server usage may be detected even though server resources are not exhausted or otherwise near a limit of exhaustion. For example, BMC 102 may take periodic measurements of system parameters for a period of time. For example, BMC 102 may check if CPU usage is greater than 95% for 1 minute, greater than 90% for 5 minutes, or greater than 90% for 30 minutes. However, in these systems, utilization rates below those thresholds might not be monitored. If a hacker is only using a portion of the resource and not tripping the prescribed usage limit, then the attack might go unnoticed. Accordingly, in some embodiments, the current usage may be observed and identified as a security risk while the associated component usage or utilization is below alarm thresholds.

Although example embodiments have been described above, other variations and embodiments may be made from this disclosure without departing from the spirit and scope of these embodiments.

We claim:

1. A system, comprising:
   a server interface;
   a management server, the management server including instructions for execution by a processor, the instructions, when loaded and executed by the processor, cause the processor to:
   access a server through the server interface;
   through the server interface, monitor current usage by an electronic device communicatively coupled to the server;
   determine a security status of the electronic device based upon the current usage; and
   take a corrective action based upon the security status.

2. A system, comprising:
   a server interface;
   a management server, the management server including instructions for execution by a processor, the instructions, when loaded and executed by the processor, cause the processor to:

access a server through the server interface;
through the server interface, monitor current usage by an electronic device communicatively coupled to the server;
determine a security status of the electronic device based upon the current usage; and
take a correction action based upon the security status through out of band (OOB) communication with a baseboard management controller (BMC) of the server.

3. A system, comprising:
a server interface;
a management server, the management server including instructions for execution by a processor, the instructions, when loaded and executed by the processor, cause the processor to:
access a server through the server interface;
through the server interface, monitor current usage by an electronic device communicatively coupled to the server;
determine a security status of the electronic device based upon the current usage;
take a correction action based upon the security status;
determine an indication of malware or a security breach on the electronic device;
selectively power down or reconfigure one or more components of the electronic device based on the determination of malware or the security breach;
isolate firmware or Unified Extensible Firmware Interface (UEFI) from a system processor of the electronic device based on the determination of malware or the security breach; and
prevent system reboot of the electronic device after a non-operational state detection based on the determination of malware or the security breach.

4. The system of claim 1, wherein the wherein the management server further includes instructions to cause the processor to:
determine a security attack on the electronic device;
reboot the electronic device; and
perform a corrective action upon the reboot of the electronic device in response to the security attack.

5. The system of claim 1, wherein the wherein the management server further includes instructions to cause the processor to:
determine that the current usage is above an expected value;
based on the determination that the current usage is above the expected value, determine that the security status of the electronic device is compromised.

6. The system of claim 1, wherein the management server further includes instructions to cause the processor to determine the security status of the electronic device based upon the current usage by evaluation of the current usage and a temperature of the electronic device.

7. A system, comprising:
a server interface;
a management server, the management server including instructions for execution by a processor, the instructions, when loaded and executed by the processor, cause the processor to:
access a server through the server interface;
through the server interface, monitor current usage by an electronic device communicatively coupled to the server;
determine the security status of the electronic device based upon the current usage by evaluation of the current usage and usage load of a resource of the electronic device; and
take a correction action based upon the security status.

8. The system of claim 1, wherein the management server further includes instructions to cause the processor to:
determine that the current usage is above an expected value;
based on the determination that the current usage is above the expected value, determine that the security status of the electronic device is compromised.

9. The system of claim 1, wherein the management server further includes instructions to cause the processor to:
evaluate current usage of a specific subcomponent of the electronic device; and
determine the security status of the electronic device based upon the current usage of the specific subcomponent of the electronic device.

10. The system of claim 9, wherein the specific subcomponent of the electronic device is a drive caddy and the management server further includes instructions to cause the processor to determine that the current usage is above an expected value for the drive caddy and, as a result, determine that the security status of the electronic device is compromised.

11. The system of claim 9, wherein the specific subcomponent of the electronic device is a drive caddy and the management server further includes instructions to cause the processor to determine that the current usage is above an expected value for the drive caddy and, as a result, determine that the security status of the electronic device is compromised by unauthorized data encryption.

12. A system, comprising:
a server interface;
a management server, the management server including instructions for execution by a processor, the instructions, when loaded and executed by the processor, cause the processor to:
access a server through the server interface;
through the server interface, monitor current usage by an electronic device communicatively coupled to the server;
evaluate current usage of a specific subcomponent of the electronic device; and
determine the security status of the electronic device based upon the current usage of the specific subcomponent of the electronic device;
wherein:
the specific subcomponent of the electronic device is a processor; and
the management server further includes instructions to cause the processor to determine that the current usage is above an expected value for the processor and, as a result, determine that the security status of the electronic device is compromised by unauthorized compute intensive server operations.

13. A system, comprising:
a server interface;
a management server, the management server including instructions for execution by a processor, the instructions, when loaded and executed by the processor, cause the processor to:
access a server through the server interface;
through the server interface, monitor current usage by an electronic device communicatively coupled to the server;

evaluate current usage of a specific subcomponent of the electronic device; and
determine the security status of the electronic device based upon the current usage of the specific subcomponent of the electronic device;
wherein:
the specific subcomponent of the electronic device is a processor; and
the management server further includes instructions to cause the processor to determine that the current usage is above an expected value for the processor and, as a result, determine that the security status of the electronic device is compromised by unauthorized server resource exhaustion.

14. The system of claim 9, wherein the specific subcomponent of the electronic device is a processor and the management server further includes instructions to cause the processor to determine that the current usage is above an expected value for the processor and, as a result, determine that the security status of the electronic device is compromised by unauthorized server resource usage.

15. The system of claim 9, wherein the specific subcomponent of the electronic device is a processor and the management server further includes instructions to cause the processor to determine that the current usage is below an expected value for the processor and, as a result, determine that the security status of the electronic device is compromised by a denial-of-service attack.

16. An article of manufacture including a non-transitory machine-readable medium, the medium including instructions, the instructions, when loaded and executed by a processor, cause the processor to:
access a server through a remote interface;
through the remote interface, monitor current usage by an electronic device communicatively coupled to the server;
determine a security status of the electronic device based upon the current usage; and
take a corrective action based upon the security status through out of band (OOB) communication with a baseboard management controller (BMC) of the server.

17. A method, comprising, at a server:
monitoring current usage by an electronic device communicatively coupled to the server;
determining a security status of the electronic device based upon the current usage; and
taking a corrective action based upon the security status through out of band (OOB) communication with a baseboard management controller (BMC) of the server.

18. An article of manufacture including a non-transitory machine-readable medium, the medium including instructions, the instructions, when loaded and executed by a processor, cause the processor to:
access a server through a remote interface;
through the remote interface, monitor current usage by an electronic device communicatively coupled to the server;
determine a security status of the electronic device based upon the current usage;
determine an indication of malware or a security breach on the electronic device based upon the security status;
selectively power down or reconfigure one or more components of the electronic device based on the determination of malware or the security breach;
isolate firmware or Unified Extensible Firmware Interface (UEFI) from a system processor of the electronic device based on the determination of malware or the security breach; and
prevent system reboot of the electronic device after a non-operational state detection based on the determination of malware or the security breach.

19. An article of manufacture including a non-transitory machine-readable medium, the medium including instructions, the instructions, when loaded and executed by a processor, cause the processor to:
access a server through a remote interface;
through the remote interface, monitor current usage by an electronic device communicatively coupled to the server;
determine a security status of the electronic device based upon the current usage and usage load of a resource of the electronic device; and
take a correction action based upon the security status.

20. An article of manufacture including a non-transitory machine-readable medium, the medium including instructions, the instructions, when loaded and executed by a processor, cause the processor to:
access a server through a remote interface;
through the remote interface, monitor current usage by an electronic device communicatively coupled to the server;
evaluate current usage of a specific subcomponent of the electronic device;
determine the security status of the electronic device based upon the current usage of the specific subcomponent of the electronic device; and
take a corrective action based upon the security status;
wherein:
the specific subcomponent of the electronic device is a processor; and
the instructions are further to cause the processor to determine that the current usage is above an expected value for the processor and, as a result, determine that the security status of the electronic device is compromised by unauthorized compute intensive server operations.

21. An article of manufacture including a non-transitory machine-readable medium, the medium including instructions, the instructions, when loaded and executed by a processor, cause the processor to:
access a server through a remote interface;
through the remote interface, monitor current usage by an electronic device communicatively coupled to the server;
evaluate current usage of a specific subcomponent of the electronic device;
determine the security status of the electronic device based upon the current usage of the specific subcomponent of the electronic device; and
take a corrective action based upon the security status;
wherein:
the specific subcomponent of the electronic device is a processor; and
the management server further includes instructions to cause the processor to determine that the current usage is above an expected value for the processor and, as a result, determine that the security status of the electronic device is compromised by unauthorized server resource exhaustion.

22. A method, comprising, at a management server:
monitoring current usage by an electronic device communicatively coupled to a server;
determining a security status of the electronic device based upon the current usage; and
access the server through a remote interface;
through the remote interface, monitor current usage by an electronic device communicatively coupled to the server;
determine a security status of the electronic device based upon the current usage;
determine an indication of malware or a security breach on the electronic device based upon the security status;
selectively power down or reconfigure one or more components of the electronic device based on the determination of malware or the security breach;
isolate firmware or Unified Extensible Firmware Interface (UEFI) from a system processor of the electronic device based on the determination of malware or the security breach; and
prevent system reboot of the electronic device after a non-operational state detection based on the determination of malware or the security breach.

23. A method, comprising, at a management server:
monitoring current usage by an electronic device communicatively coupled to a server;
determining a security status of the electronic device based upon the current usage and usage load of a resource of the electronic device; and
taking a correction action based upon the security status.

24. A method, comprising, at a management server:
monitoring current usage by an electronic device communicatively coupled to a server;
evaluating current usage of a specific subcomponent of the electronic device;
determining the security status of the electronic device based upon the current usage of the specific subcomponent of the electronic device; and
taking a corrective action based upon the security status; wherein:
the specific subcomponent of the electronic device is a processor; and
determining that the current usage is above an expected value for the processor and, as a result, determine that the security status of the electronic device is compromised by unauthorized compute intensive server operations.

25. A method, comprising, at a management server:
monitoring current usage by an electronic device communicatively coupled to a server;
evaluating current usage of a specific subcomponent of the electronic device;
determining the security status of the electronic device based upon the current usage of the specific subcomponent of the electronic device; and
taking a corrective action based upon the security status; wherein:
the specific subcomponent of the electronic device is a processor; and
the management server further includes instructions to cause the processor to determine that the current usage is above an expected value for the processor and, as a result, determine that the security status of the electronic device is compromised by unauthorized server resource exhaustion.

* * * * *